United States Patent [19]
Sohnly

[11] Patent Number: 5,291,734
[45] Date of Patent: Mar. 8, 1994

[54] PRIMARY FORCE RING FOR MAGNETOHYDRODYNAMIC PROPULSION SYSTEM

[76] Inventor: Michael J. Sohnly, 17723 - 160th Ave., SE., Renton, Wash. 98058

[21] Appl. No.: 638

[22] Filed: Jan. 5, 1993

Related U.S. Application Data

[62] Division of Ser. No. 791,789, Nov. 12, 1991, Pat. No. 5,211,006.

[51] Int. Cl.⁵ ............................ F03H 1/00; H05H 5/00
[52] U.S. Cl. ........................................ 60/202; 313/351.1
[58] Field of Search ............... 60/200.1, 202, 203.1, 60/204; 313/359.1, 360.1, 361.1, 362.1

[56] References Cited

U.S. PATENT DOCUMENTS

| | | | |
|---|---|---|---|
| 2,997,013 | 8/1961 | Rice . | |
| 3,032,978 | 8/1962 | Kunen . | |
| 3,155,858 | 11/1964 | Lary et al. | 60/202 |
| 3,156,090 | 11/1964 | Kaufman | 60/202 |
| 3,177,654 | 4/1965 | Gradecak | 60/202 |
| 3,232,046 | 2/1966 | Meyer | 60/202 |
| 3,243,954 | 4/1966 | Cann | 60/202 |
| 3,279,175 | 10/1966 | Hendel et al. . | |
| 3,279,176 | 10/1966 | Boden . | |
| 3,322,374 | 5/1967 | King, Jr. . | |
| 3,380,249 | 4/1968 | Meckel | 60/202 |
| 3,535,586 | 10/1970 | Sabol | 60/202 |

Primary Examiner—Louis J. Casaregola
Attorney, Agent, or Firm—J. Robert Cassidy

[57] ABSTRACT

A Primary Force Ring for magnetohydrodynamic propulsion of a vehicle including: an endless closed loop vehicle housing; a plurality of spaced pairs of positive and negative electric field plates coupled to at least one voltage source and mounted in the housing for generating a plurality of discrete spaced electric fields within the housing; and, a plurality of electromagnetic field coils mounted in the housing with one field coil intermediate each pair of field plates for generating an endless segmented closed loop magnetic field contained within the housing and intersecting the discrete electric fields at substantially right angles.

6 Claims, 14 Drawing Sheets

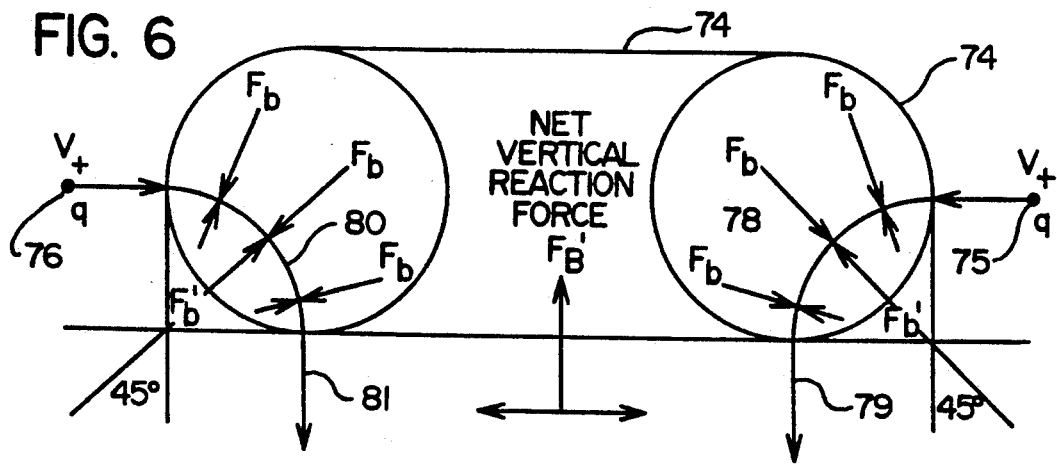
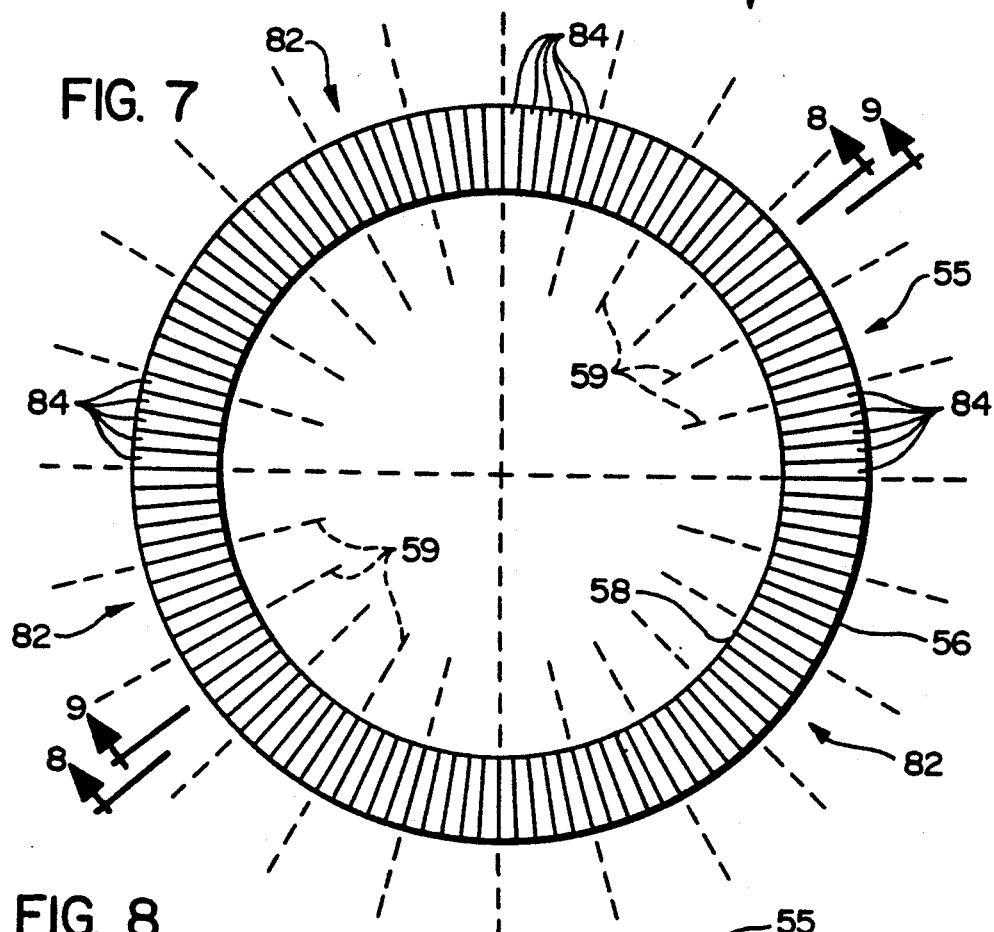
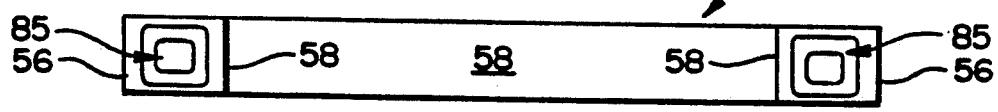
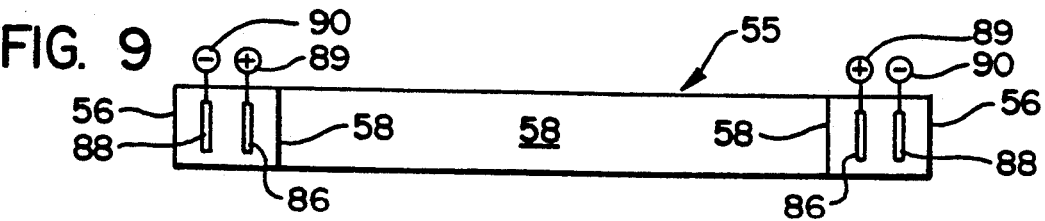

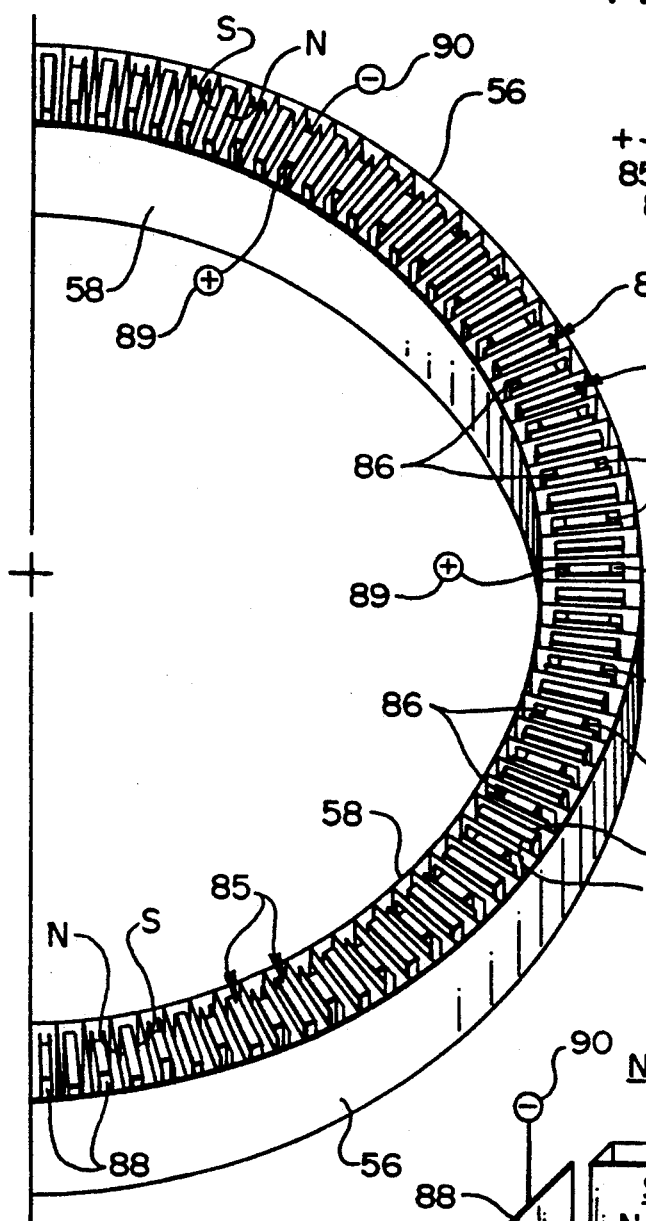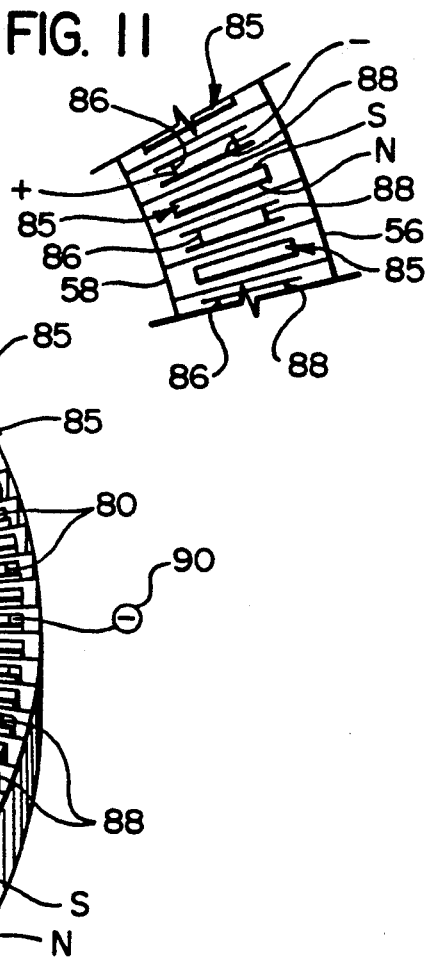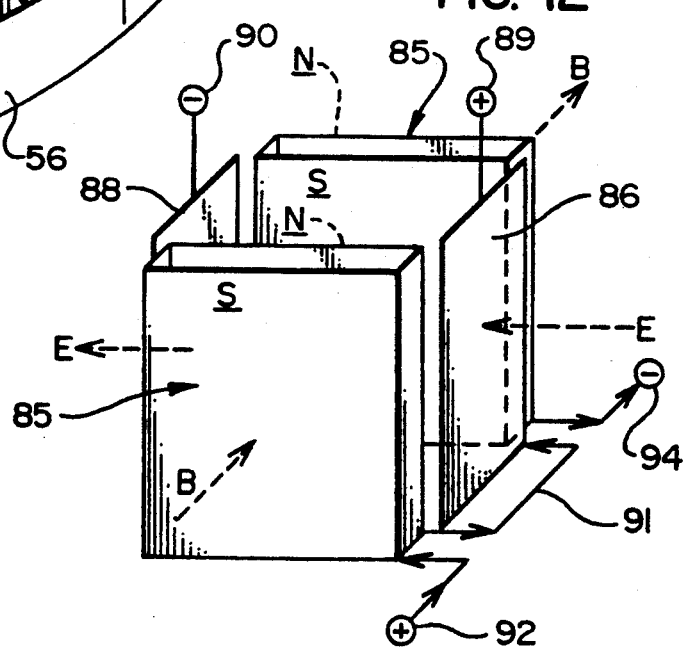

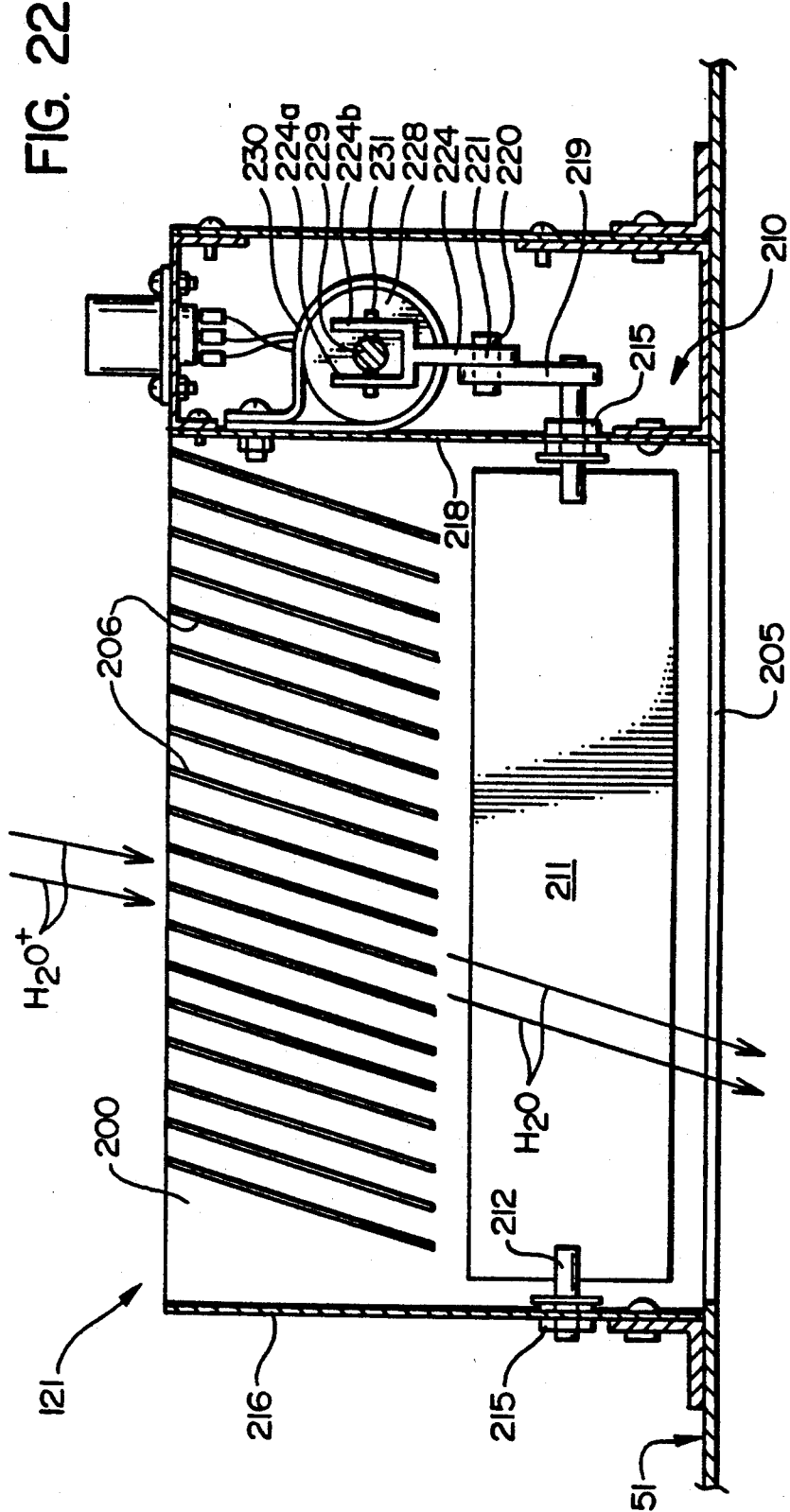

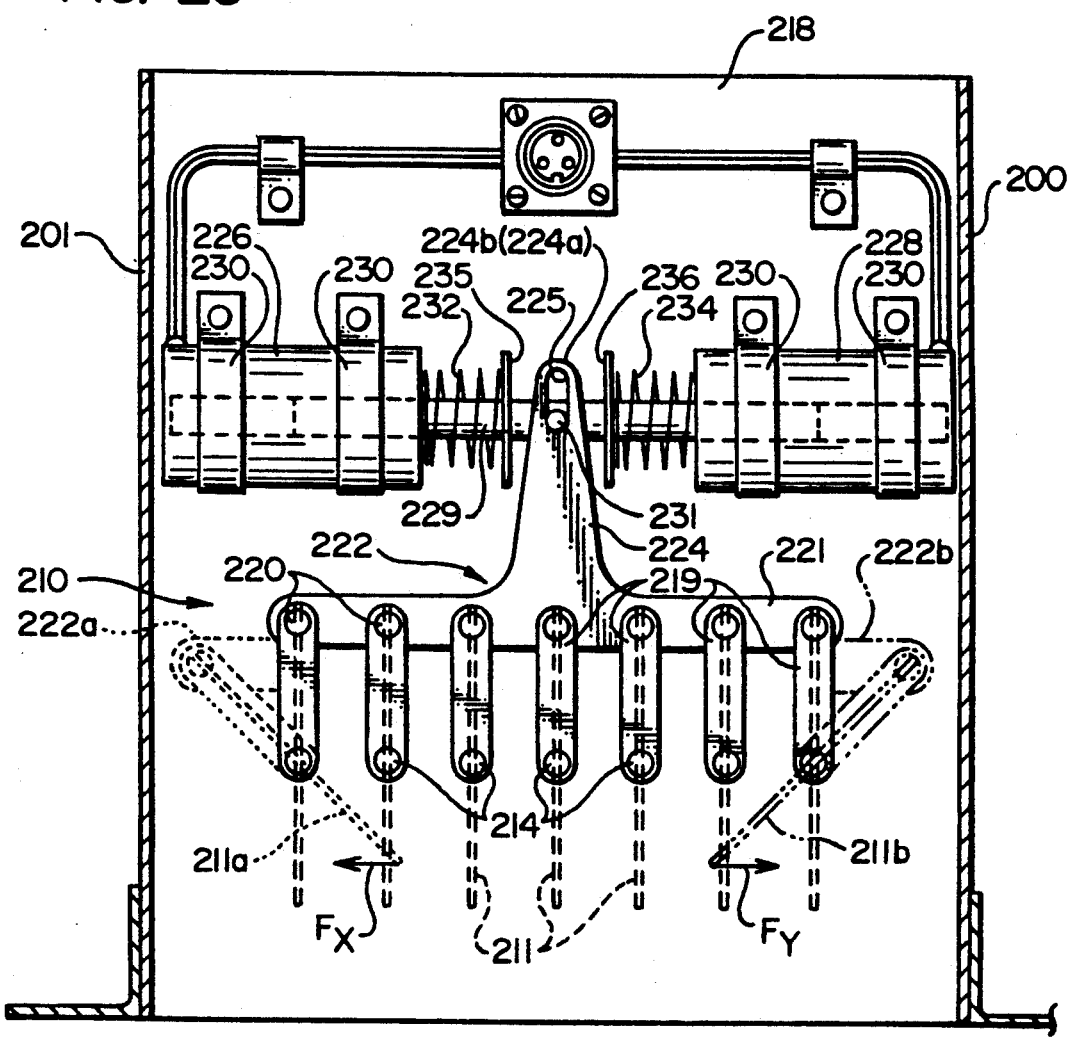

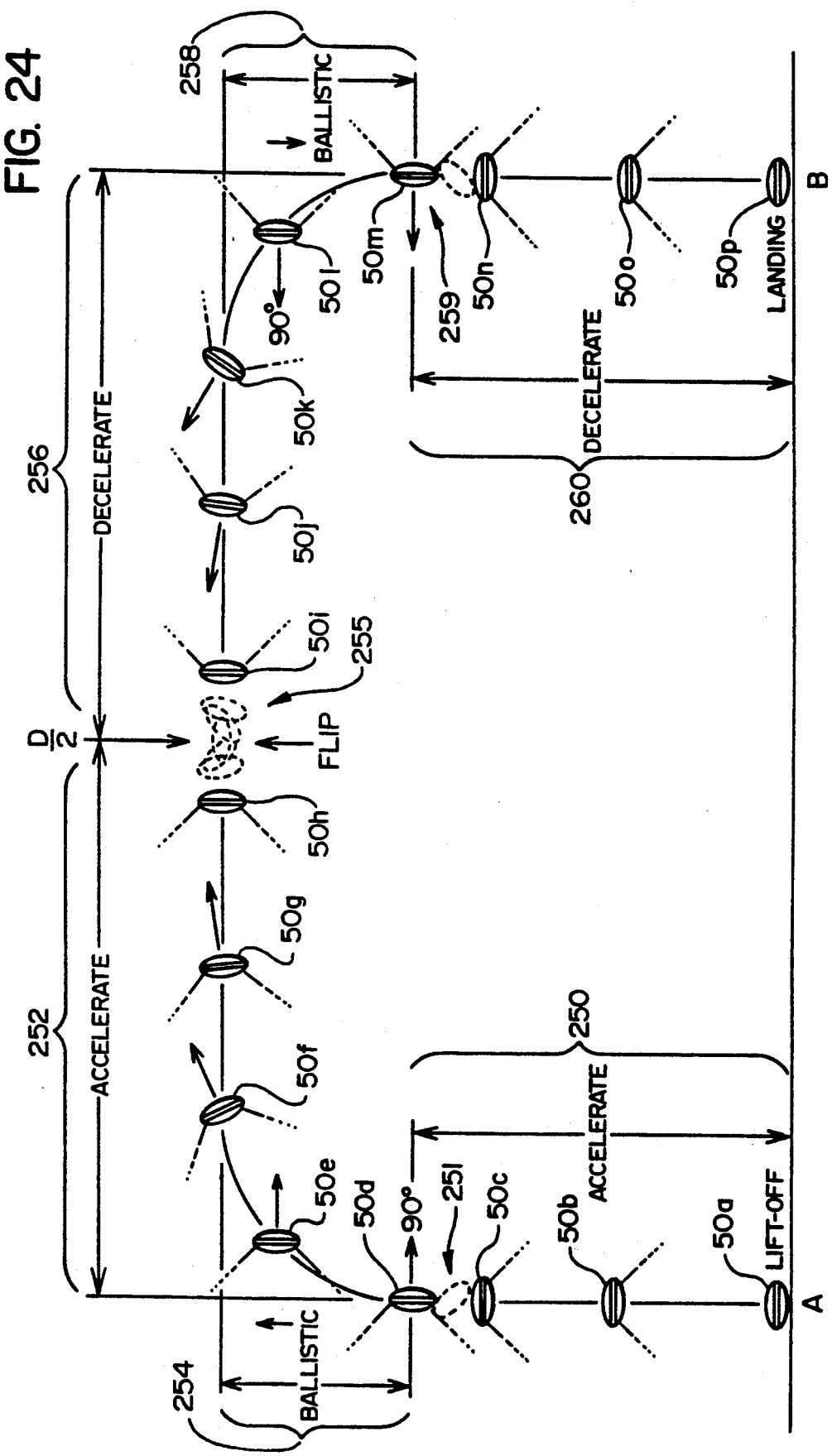

PRIMARY FORCE RING FOR MAGNETOHYDRODYNAMIC PROPULSION SYSTEM

The present application is a divisional application based on Applicant's co-pending application, Ser. No. 07/791,789, filed Nov. 12, 1991, now U.S. Pat. No. 5,211,006.

BACKGROUND OF THE INVENTION

1. Technical Field

The present invention relates generally to a magnetohydrodynamic propulsion system for a vehicle; and, more particularly, to a propulsion system for aircraft and/or aerospace vehicles suitable for use in either point-to-point intra- and/or intercontinental travel—i.e., between spaced points of embarkation and destination points located on the same continent and/or different continents on earth—or in connection with interplanetary or deep space travel.

More specifically, the present invention relates to methods and apparatus comprising a magnetohydrodynamic propulsion system which is highly fuel efficient and environmentally neutral or safe. To this end, the present invention employs an efficient ion generation system capable of use with a wide range of fuels, but which finds particularly advantageous use with hydrogen/oxygen fuels—viz., fuels that are economical and in plentiful supply since they can be readily extracted from seawater and the like. The arrangement is such that water is broken down by electrolysis into hydrogen and oxygen which are then stored in separate collector tanks mounted within the vehicle. In operation, hydrogen and oxygen are introduced into a plasma generator in the form of a conventional hydrogen/oxygen rocket motor having a combustion chamber where they are ignited to form a plasma of positively charged water molecules ($H_2O^+$) and electrons ($e^-$). The plasma is then passed through a small deflection magnetic field coil where the positively charged water molecules ($H_2O^+$) and electrons ($e^-$) are, due to Lorentz forces, separated and directed along opposite paths—e.g., the electrons ($e^-$) may move in a clockwise direction while the positively charged water molecules ($H_2O^+$) move in a counterclockwise direction. In essence, the electrons ($e^-$), which have a very small mass, are attracted to, and attached to, the nozzle of the hydrogen/oxygen rocket motor where they are conveyed via the vehicle frame, or other suitable conductive transmission line, to a point suitable for later recombination with the positively charged water molecules ($H_2O^+$) after the latter have been accelerated at high velocity through an electromagnetic field to create the forces necessary to propel the vehicle.

As a second significant aspect of the invention, the propulsion system of the present invention employs means comprising what is herein termed a "Primary Force Ring" for generating a segmented toroidal magnetic field. To this end, the illustrative and exemplary form of the invention includes an endless, or closed-loop, housing which is here ring-shaped and which is subdivided into one hundred and twenty (120) adjacent segment openings. An electromagnetic field coil is positioned within every other segment opening with such field coils alternating with pairs of positive and negative electric field plates disposed within the intermediate segment openings—i.e., there are sixty (60) electromagnetic field coils alternating with sixty (60) pairs of positive and negative electric field plates in the exemplary form of the invention, with the positive and negative electric field plates in each pair being parallel to the magnetic field and radially spaced from one another. As a consequence of the foregoing construction, the magnetic field is, except for negligible fringing effects, entirely confined within, and extends centrally through, the Primary Force Ring, while the electric field generated by each pair of positive and negative electric field plates intersects the magnetic field at ninety degrees (90°)—i.e., the magnetic field extends circumferentially about the vertical center line passing through the vehicle, while the electric fields extend radially through the circular magnetic field.

As the ensuing description proceeds, those skilled in the art will appreciate that the particular number of segment openings in the Primary Force Ring and, therefore, the number of electromagnetic field coils and alternating pairs of positive and negative electric field plates, is not critical to the present invention and may vary widely from significantly fewer to significantly more than the illustrative one hundred and twenty (120) segment openings dependent upon such variables as the size of the vehicle to be propelled. Moreover, while the invention finds particularly advantageous results can be achieved using a circular ring-shaped Primary Force Ring which is readily comformable to a saucer-shaped vehicle, the invention is not so limited; and, the Primary Force Ring can take other configurations such, for example, as rectilinear or polygonal provided only that the structure defines an endless or closed loop configuration.

Thus, the arrangement is such that the positively charged water molecules ($H_2O^+$) exiting the ion generation system or rocket motor are: i) introduced into the magnetic field intermediate each pair of spaced electric field plates; ii) acted upon by Lorentz forces; and iii), accelerated through such field, exiting the Primary Force Ring beneath the vehicle where they are recombined with the electrons ($e^-$) and discharged into the environment as innocuous neutral water droplets. And, because the resulting Lorentz forces applied to the positively charged water molecules ($H_2 0^+$) result in the application of an equal and opposite reaction force to the magnetic field, and therefore to the Primary Force Ring and the vehicle, all in accordance with Newton's Law, such reaction force, when uniformly applied about the periphery of the vehicle, serves to propel the vehicle through the atmosphere and/or in space along a line coincident with the vehicle's vertical center line. Alternatively, the reaction force can be controlled such that it is non-uniformly applied about the vehicle periphery for the purpose of changing its attitude such that the vertical axis of the vehicle is disposed in an attitude other than vertical with respect to earth. Moreover, vehicles propelled by the present invention can be equipped with a YAW controller such that the reaction force generated can be employed to turn the vehicle about its vertical axis and/or to propel the vehicle in any desired direction normal or at an acute included angle to the vehicle's vertical axis.

The present invention is characterized by the economic production of large quantities of ions or positively charged particles—preferably, but not necessarily, positively charged water molecules ($H_2 0^+$)—and the generation of significant thrust at high specific impulse. Indeed, specific impulse on the order of equal to, and even greater than, 36,000 is readily achieved with the present invention as contrasted to specific impulse in the range of 360 to 400 for a standard hydrogen/oxygen rocket motor. Moreover, because the Primary Force Ring comprises a continuous, but segmented, toroid, essentially all magnetic and electric fields—except for minor fringing effects—are maintained internal of the Primary Force Ring, thereby substantially eliminating the presence of such fields external to the vehicle. This fact, for all practical purposes, precludes attraction of ferrous or other magnetic materials from the surrounding environment, minimizes pitting and corrosion of the vehicle hull, and substantially eliminates other undesirable effects of environmental magnetic fields.

In carrying out the present invention, the vehicle configuration is unimportant provided only that it permits of usage of a closed loop, segmented, toroidal Primary Force Ring lying in the horizontal plane of the vehicle normal to a vertical axis passing through the vehicle. Thus, the present invention finds particularly advantageous use with disk or saucer-shaped vehicles; and, it has herein been disclosed in an exemplary embodiment with such a vehicle. However, as the ensuing description proceeds, and as previously noted, those skilled in the art will appreciate that the actual vehicle configuration can be other than saucer-shaped—for example, the vehicle can have an ellipsoidal, elongate, polygonal or even rectilinear configuration when viewed in plan—provided only that the vehicle configuration permits inclusion of a closed loop, continuous, segmented, toroidal Primary Force Ring employing spaced positive and negative electric fields plates interposed in the segment openings in the toroidal or closed loop segmented magnetic field establishing a series of spaced electric field intersecting the segmented toroidal magnetic field at substantially right angles with respect thereto.

2. Background Art

The prior art is replete with disclosures of proposed systems for generating and accelerating charged particles; and, in some instances, for using variations of such conventional systems for vehicle propulsion purposes. For example, U.S. Pat. No. 3,322,374 issued to J. F. King, Jr. in 1967, discloses a magnetohydrodynamic propulsion system including means for ionizing the fluid medium surrounding the vehicle and through which the vehicle is moving. To this end, King provides a series of electrically conductive, inductive, driving rings or coils surrounding the vehicle and spaced along its axis of movement. The driving rings are excited by applying AC currents thereto so as to produce a moving or pulsating magnetic field of varying intensity external to the vehicle and wherein the point of maximum fluid density travels progressively from the leading end or top of the vehicle to the trailing end or bottom of the vehicle, thereafter switching back to the leading end and repeating its travel. An air ionizer is provided at the leading end or top of the vehicle to highly ionize the air surrounding the vehicle and provide a surrounding field or cloud in which eddy currents may be induced by the magnetic field generated by the series of driving rings. It is stated that such traveling field serves to generate or induce an eddy current flowing between finite particles of atmosphere which co-act with the flux of the field to set up a force on the conductor tending to cause the conductor to move with the traveling field. Hence, a powerful thrust is said to be exerted on the vehicle in the desired direction of travel by the oppositely directed travel of the conductor—i.e., the ionized or plasma medium.

It is believed that the King propulsion system is, theoretically, operative; but, that it is not a practical system capable of independent self-flying operation. That is, the system is believed to require a very large separate and independent power source that must be cabled to the vehicle. The system is further environmentally disadvantageous because it employs magnetic fields pulsating into the external atmosphere surrounding the vehicle.

Boden U.S. pat. No. 3,279,176 assigned to North American Aviation, Inc. discloses a conventional rocket engine propulsion system for aerospace vehicles utilizing electrically accelerated cesium ions to develop rocket engine thrust. The patent states that usage of electrical energy for generating ions and accelerating such ions between positive and negative charged electrodes in a high potential electrical field enables the weight of the vehicle to be greatly reduced. Again, however, it is believed that the system, although practical and in use, is highly inefficient, requiring an extremely large power source for the accelerating grids in order to maintain the electric field; and, of course, the quantity of ions generated will be relatively low for a given power input.

In Hendel et al U.S. Pat. No. 3,279,175, apparatus is disclosed for generating and accelerating charged particles. Thus, the patentees propose using an R.F. generator to create a moving electric field for ionizing a plasma which is set in motion and directed by magnetic coils as shown in Hendel et al FIG. 4. As in the King patent, the magnetic field created is environmentally external to the apparatus. Because the ions are generated by radio frequencies, it is believed that the number of ions generated is relatively small; and, since the charged particles are constrained for movement parallel with the magnetic field, they have a tendency to spin.

U.S. Pat. No. 3,243,954 issued to Electro-Optical Systems, Inc. as the assignee of G. L. Cann discloses a plasma accelerator using Hall currents to achieve extremely high gas velocities. An arc jet is utilized to heat and partially ionize a gas stream which is passed through a sonic orifice and expanded in a supersonic nozzle. A second electric discharge is maintained along the length of the nozzle by striking a discharge from a ring cathode at the nozzle outlet to the anode of the first arc. An axisymmetric magnetic field is applied throughout the volume of the nozzle such that the field strength drops to a very small value at the nozzle outlet. The arrangement serves to induce a tangential Hall current that interacts with the applied magnetic field to produce axial and radial forces on the gas. As shown in FIG. 4 of the Cann patent, an accelerator comprising a plurality of magnetic field coils encased within a metal tube is employed for accelerating the plasma.

In U.S. Pat. No. 3,232,046 issued to the Aerospace Corporation as the assignee of R. X. Meyer, the patentee discloses a magnetohydrodynamic high-specific-impulse engine said to be suitable for space operation. The system employs means for ionizing a gas which is moved through the device by electrostatic and magnetic means. An external magnetic field generating means is employed to establish a magnetic lens which serves to direct the charged particles through an ejection nozzle.

U.S Pat. No. 3,177,654 issued to Ryan Aeronautical Company as the assignee of V. Gradecak discloses what is purported to comprise an electric aerospace propulsion system. As here shown, the patentee employs spaced charged screens through which air is passed and ionized. Magnetic coils surround the ionization chamber and are employed to squeeze the ion plasma out in a jet. Again, since the ions are electrically generated, a significant power source is required imposing severe limitations on the quantity of ions that can be generated. No means are provided for confining the magnetic field to the interior of the vehicle; and, therefore, the system is again environmentally undesirable.

Lary et al U.S. Pat. No 3,155,858 assigned to United Aircraft Corporation discloses an ion accelerator for generating thrust for propulsion in space. Hot cesium gas is introduced into an annular opened-ended chamber through a porous tungsten ring to produce a supply or source of ions through contact ionization. A magnetic element extends axially through the chamber and is surrounded by a magnetizing coil. Under the influence of both the magnetic field and the electric field from an external power supply, the ions are moved along the chamber and ejected from the nozzle end thereof. Because the ions are electrically generated, thrust is limited.

In Kunen U.S. Pat. No. 3,032,978 assigned to Republic Aviation Corporation, a magnetic compression engine is disclosed employing charged plates which serve to electrically ionize the plasma. The ionized plasma is directed through an outlet nozzle as shown in FIGS. 3 through 5 by means of electrodes and magnets which act upon the stream.

U.S. Pat. No. 2,997,013 issued to W. A. Rice is of interest for its disclosure of a propulsion system for use with a vehicle traveling in either salt water—an electrolyte—or in ionic space. The outer skin of the hull of the vehicle is provided with a series of magnets and a series of electrodes that carry high current. The magnetic flux and electric field generated act on the electrolytic and/or ionic environment to propel the vessel. The system is environmentally disadvantageous because both the electromagnetic fields and the electric fields are external to the hull of the system, thereby creating a corrosive effect and attracting environmental metallic materials.

In summary, prior art systems of the type disclosed in the Rice patent and the other prior art patents discussed above generally employ magnetic and/or electric fields external to the vehicle body which tend to, or are required to, interact with the environment. For the most part, ions are generated employing electric methods. Such systems tend to be highly inefficient and require exorbitant amounts of electric power to generate a relatively small quantity of ions.

SUMMARY OF THE INVENTION

The present invention overcomes all of the disadvantages inherent in the known prior art by: i) taking advantage of the reaction forces applied to a magnetic field as charged particles are passed through the field and subjected to Lorentz forces to establish a magnetohydrodynamic propulsion system wherein essentially all magnetic and electric fields are maintained internally of the vehicle except for minor and negligible fringing effects; ii) employing combustion-type rocket motors to create a plasma containing an abundance of positively charge particles and electrons; iii) separating the positively charged particles and electrons and accelerating the positively charged particles through a segmented, toroidal, closed loop magnetic field with the particles being acted upon and deflected within the magnetic field by Lorentz forces and wherein the resulting equal and opposite reaction force is applied directly to the magnetic field and, therefore, indirectly to the vehicle frame so as to propel the vehicle through the surrounding atmosphere and/or through space; and iv), recombining the electrons with the positively charged particles exiting the segmented, toroidal magnetic field. In the practice of an exemplary form of the invention, the fuel employed is hydrogen/oxygen derived from electrolysis of seawater and the like; the rocket motors utilize hydrogen and oxygen for fuel; the positively charged particles or ions comprise positively charged water molecules ($H_2O^+$); and, wherein the positively charged water molecules ($H_2O^+$) exiting the magnetic field are recombined with electrons ($e^-$) to form innocuous water droplets which: i) can be safely discharged at high velocity from the vehicle into the surrounding atmosphere or space without adversely affecting the environment; and ii), can be directed against adjustable YAW control flaps for creating lateral force components to propel the vehicle laterally with respect to its vertical axis.

Stated differently, the present invention takes advantage of the fact that it is known that positively charged particles accelerated through a magnetic field are acted upon and deflected by Lorentz forces; and, consequently, in accordance with Newton's Law, the resultant Lorentz force is countered by an equal and opposite reaction force which is applied directly to the magnetic field and, therefore, indirectly to the frame of the vehicle itself for propulsion purposes.

In carrying out the invention, a Primary Force Ring is mounted on the vehicle frame comprising means for generating a closed loop, segmented, toroidal magnetic field having spaced positive and negative electric field plates positioned within alternate segment openings in the Primary Force Ring. As a consequence of this construction, essentially all magnetic and electric fields employed are contained internally of the Primary Force Ring, except for minor and negligible fringing effects, thereby insuring that the exterior of the vehicle is substantially free of magnetic and/or electric fields.

Accordingly, it is a general objective of the present invention to provide a magnetohydrodynamic propulsion system for an aerospace vehicle which: i) employs charged particles or ions produced economically and in large quantities by combustion in conventional rocket motors; ii) employs a Primary Force Ring having a closed loop, segmented, toroidal magnetic field with spaced positive and negative electric field plates positioned within the openings in the segmented, toroidal magnetic field; iii) employs an adjustable electric field to accelerate the positively charged particles through the segmented magnetic field; iv) utilizes the reaction force which is equal and opposite to the resultant Lorentz force and which acts directly upon the segmented, toroidal, magnetic field and, therefore, indirectly upon the Primary Force Ring and the vehicle, to propel the vehicle through the atmosphere and/or space; and v), recombines the positively charged particles exiting from the segmented, toroidal, magnetic field in the Primary Force Ring with electrons to discharge innocuous and neutral spent fuel into the environment.

It is a further and more specific object of the invention to provide a magnetohydrodynamic propulsion system of the foregoing type wherein essentially all magnetic and electric fields are contained internally of the vehicle and which do not, therefore, adversely impact the external vehicle environment.

In another of its important aspects, it is an object of the invention to provide an aerospace vehicle of the foregoing type which can travel great distances at high velocity and under controlled acceleration/deceleration, thereby: i) minimizing and, in some cases eliminating, the time period when the crew and/or passengers are subjected to the effects of weightlessness; ii) reducing the weight of the vehicle; and iii), since the vehicle is maintained at constant acceleration/deceleration, eliminating the need for heat shields as the vehicle reenters the atmosphere.

It is a further object of the present invention to provide a vehicle and propulsion system therefor which is entirely self-contained and which eliminates the need for booster systems.

A further object of the present invention is the provision of a magnetohydrodynamic propulsion system for aerospace vehicles which is highly efficient, having a specific impulse of 36,000 or greater, thereby enabling intra- and/or intercontinental travel between widely spaced points of origin and destination in a matter of minutes, or interplanetary or deep space travel in a matter of hours or days (as contrasted with presently known space vehicles requiring months, or even years, to travel to distant planets), all with minimal fuel consumption.

DESCRIPTION OF THE DRAWINGS

These and other objects and advantages of the present invention will become more readily apparent upon reading the following Detailed Description and upon reference to the attached drawings, in which:

FIG. 6 is a force/velocity vector diagram similar to FIG. 5, but theoretically illustrating the Lorentz forces applied to multiple particles as they enter a continuous, closed loop, toroidal magnetic field from opposite directions, transit the field, and exit therefrom;

FIG. 7 is a highly diagrammatic plan view in block and line form, here depicting an exemplary Primary Force Ring structure embodying features of the present invention and illustrating also, in broken lines, portions of the radial spars or bulkheads constituting a part of an exemplary aerospace vehicle's airframe;

FIG. 8 is a vertical sectional view, but in highly diagrammatic block and line form, taken substantially along the line 8—8 in FIG. 7, here depicting a pair of exemplary electromagnetic field coil units disposed within the Primary Force Ring on diametrically opposite sides thereof;

FIG. 9 is a view similar to FIG. 8, but here taken substantially along the line 9—9 in FIG. 7 and illustrating a pair of exemplary electric field units disposed on diametrically opposite sides of the Primary Force Ring;

FIG. 10 is a fragmentary isometric view, in diagrammatic block and line form with some components removed for purposes of clarity, here depicting in somewhat greater detail the structure of the exemplary Primary Force Ring shown in FIG. 7;

FIG. 11 is an enlarged fragmentary plan view, in diagrammatic block and line form, illustrating a portion of the Primary Force Ring shown in FIG. 10 in somewhat greater detail, here showing the alternating array of electromagnetic field coils and pairs of positive and negative electric field plates;

FIG. 12 is a highly diagrammatic isometric view here illustrating a magnetic field produced by a pair of spaced electromagnets and an intersecting electric field produced by positive and negative spaced electric field plates interposed between the spaced electromagnets with the magnetic and electric fields intersecting at an angle of ninety degrees (90°);

FIG. 22 is a diagrammatic vertical elevational view, partly in section, here depicting details of the electron transfer grid and an exemplary YAW controller;

FIG. 23 is a diagrammatic vertical elevational view, partly in section, of an exemplary YAW control assembly used in conjunction with the present invention, here depicting the YAW controller vanes in broken lines when disposed in the inoperative or neutral position and illustrating also one of the vanes in dotted lines and one in phantom lines when shifted to respective ones of opposite operative limit positions, it being understood that all vanes in a given YAW controller assembly are shifted in unison by the same degree and in the same direction; and, FIG. 24 is a highly diagrammatic flight profile here depicting the movement of a vehicle under controlled acceleration/deceleration conditions through an aerospace trajectory from a point of embarkation to a destination point.

Figure 1:
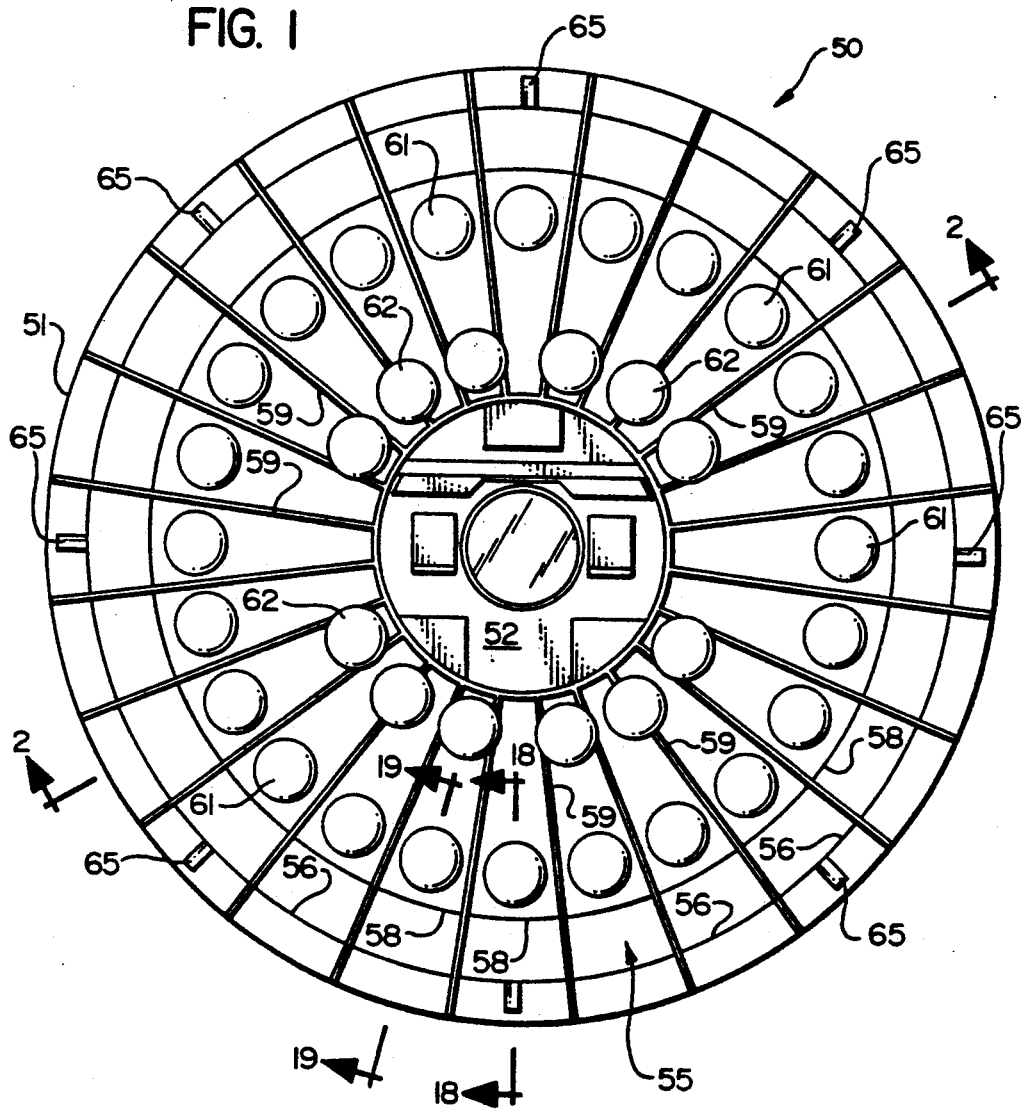
FIG. 1 is a highly diagrammatic plan view of a exemplary aerospace vehicle embodying features of the present invention with the vehicle here shown only diagrammatically and with portions of the hull removed so as to expose inner portions of the vehicle.

While the invention is susceptible of various modifications and alternative forms, specific embodiments thereof have been shown by way of example in the drawings and will herein be described in detail. It should be understood, however, that it is not intended to limit the invention to the particular forms disclosed; but, on the contrary, the intention is to cover all modifications, equivalents and/or alternatives falling within the spirit and scope of the invention as expressed in the appended claims.

DETAILED DESCRIPTION

A. General Environment (FIGS. 1 and 2)

Figure 2:
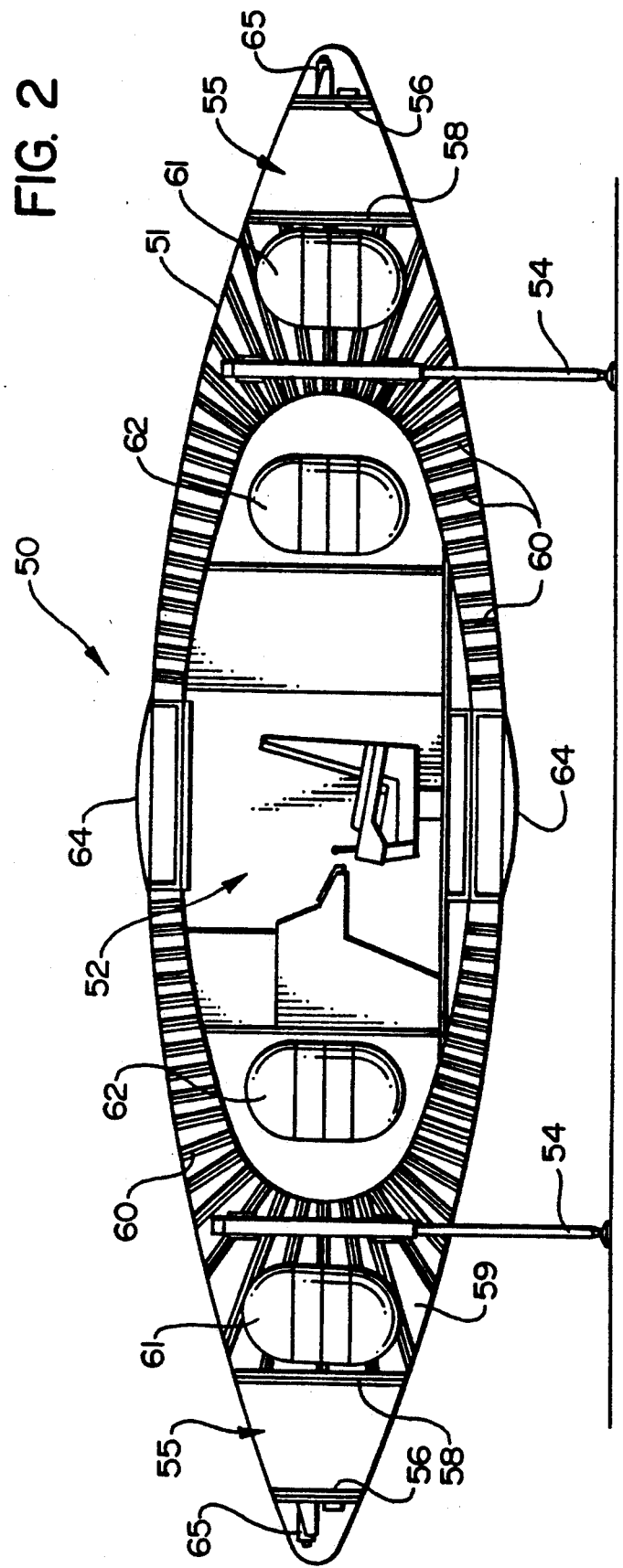
FIG. 2 is a highly diagrammatic sectional view taken substantially along the line 2—2 in FIG. 1.

Turning now to the drawings, and directing attention first to FIGS. 1 and 2 conjointly, an exemplary aerospace vehicle embodying features of the present invention has been shown and is generally indicated at 50. However, while the exemplary vehicle 50 has been depicted as a saucer-shaped vehicle, it will be apparent as the ensuing description proceeds that the shape and configuration, per se, of the vehicle are not deemed critical to the invention. Rather, the vehicle can have any desired conventional or non-conventional configuration ranging from saucer-shaped, to conical, to cigar-shaped, to elliptical, to polygonal, to rectilinear, etc., provided only that the vehicle design selected permits of employment of a propulsion assembly which is of closed-loop design having a continuous, segmented, toroidal magnetic field.

Moreover, it is to be understood that the term "toroidal" as used herein and in the appended claims, while technically accurate insofar as the illustrative prototype system is concerned since the exemplary vehicle 50 is saucer-shaped and the electromagnetic field is, in fact, a true toroid, such term is, nevertheless, used in a non-limiting sense since the magnetic field need not be a true toroid provided only that it be of segmented, closed-loop or endless design which is preferably, but not necessarily, symmetrical with respect to the vertical axis or centerline of the vehicle.

Thus, in the illustrative form of the invention, the exemplary vehicle 50 comprises a saucer-shaped vehicle having an exterior hull 51 which is, merely for purposes of example, approximately twenty-six feet (26') in diameter in the prototype vehicle herein described, a cabin or cockpit generally indicated at 52, and retractable landing pads 54 (FIG. 2). For propulsion purposes, the illustrative vehicle 50 includes a continuous, closed-loop or annular, segmented Primary Force Ring, generally indicated at 55, located slightly inboard of the outer peripheral edge of the vehicle.

Thus, in the exemplary vehicle 50, the segmented Primary Force Ring 55 is defined by a plurality of outer first peripheral wall elements 56 and a plurality of inwardly spaced second peripheral wall elements 58, each of which are secured at their opposite ends to uniformly spaced radial spars or bulkheads 59 defining a structural web or airframe. As best shown in FIG. 2, the bulkheads 59 are preferably reinforced by means of a plurality of radiating spaced T-beams or web stiffeners 60. Those skilled in the art will appreciate that the particular material(s) from which the vehicle hull 51, outer and inner peripheral walls 56, 58, bulkheads 59, and web stiffeners 60 are formed constitutes no part of the present invention provided only that such material(s) is(are) characterized by its(their) strength, lightness in weight, and inability to disrupt or interfere with a magnetic field. For example, non-magnetic sheet metal such as aluminum or other lightweight non-conductive, non-magnetic materials and/or composite materials may be employed. In the illustrative vehicle 50, there are twenty-four (24) of such bulkheads 59; and, consequently, the exemplary Primary Force Ring 55 will be seen in FIG. 1 to include twenty-four (24) closely spaced regions which, in aggregate, define a 24-segment ring-shaped or annular structure.

The Primary Force Ring 55 will hereinafter be described in greater detail; but, for the moment it should suffice to understand that the Primary Force Ring comprises a series of peripherally spaced magnetic field coils (not shown in FIGS. 1 and 2) defining a segmented, toroidal magnetic field with spaced positive and negative electric field plates (not shown in FIGS. 1 and 2) positioned in the segment openings between adjacent magnetic field coils. The exemplary vehicle 50 further includes a first plurality of fuel tanks 61 suitable for holding liquid hydrogen fuel and a second plurality of fuel tanks 62 suitable for holding liquid oxygen fuel. However, the invention is not limited to use with hydrogen/oxygen fuels and can be employed with other types of fuels.

In the exemplary vehicle 50, any suitable means can be provided for insuring adequate vision. For example, as best shown in FIG. 2, the cockpit 52 includes upper and lower clear domes or windows 64 permitting vision in an upward or downward direction; while lateral visibility is provided using a plurality of closed circuit television cameras (CCTV) 65 mounted about the periphery of the vehicle hull as best shown in FIG. 1. The material from which such clear domes or windows 64 is made is, of course, a matter of choice to persons of ordinary skill in the art relating to the construction of aerospace vehicles and forms no part of the present invention. For example, such domes or windows can be formed of any suitable clear plastic material such, merely by way of example, as Plexiglas, a registered trademark of Rohm & Haas Co., Corp.

Having in mind the foregoing general configuration of a typical non-limiting exemplary vehicular environment within which the present invention finds particularly advantageous use, attention will now be directed to the theory of operation upon which the invention is predicated.

B. Operational Theory (FIGS. 3 through 6)

Figure 3:
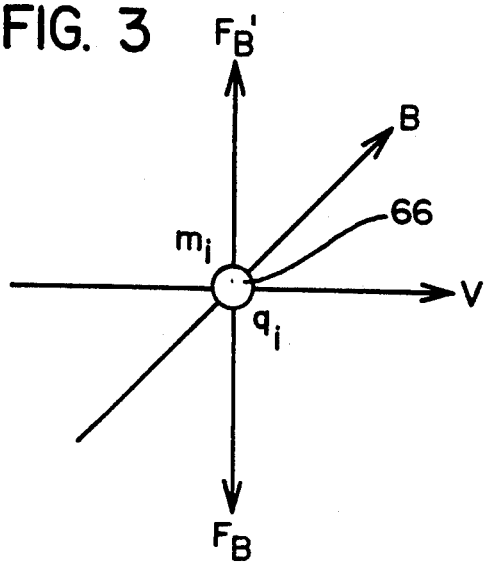
FIG. 3 is a force/velocity vector diagram here theoretically depicting the forces applied to a charged particle as it moves through a magnetic field.

Referring to FIG. 3, there has been depicted a highly simplified diagrammatic presentation of a charged particle 66 having a mass $m_i$ and a charge $q_i$ moving through a magnetic field B along a velocity vector V. As is well known to persons skilled in the art and as here shown, when a force $F_B$—for example, a Lorentz force—is applied to the charged particle 66 as it moves through the magnetic field B, an equal and opposite reaction force $F_B'$ will be exerted on the magnetic field B in accordance with Newton's Law—i.e.:

$$F_B' = F_B \quad [1]$$

Figure 4:
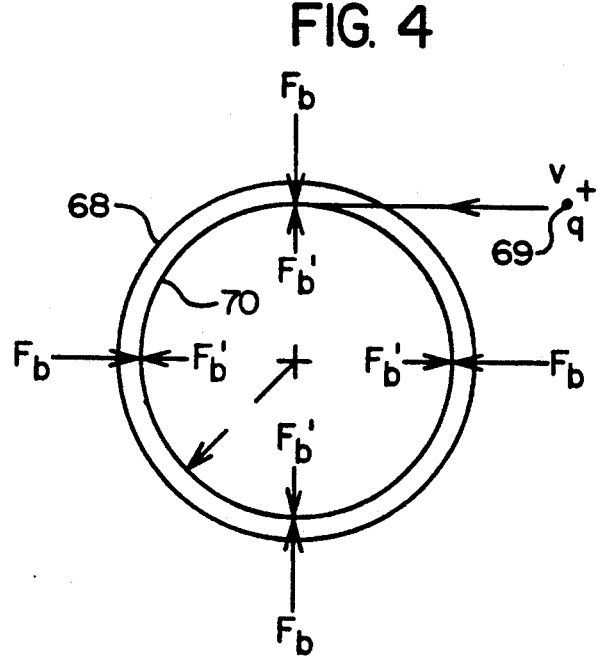
FIG. 4 is a theoretical force/velocity vector diagram depicting the forces present as a charged particle moves in a circular path through a uniform magnetic field in the absence of an electric field.

Referring next to FIG. 4, a charged particle accelerator has been depicted in highly simplified diagrammatic form. In this instance, the circle 68 is diagrammatically representative of a magnetic field extending normal to the plane of the drawing—i.e., into and/or out of the sheet. A charged particle 69 having a velocity v is shown entering the magnetic field 68; and, as is well known, under the conditions here shown, a Lorentz force $F_B$ is, therefore, applied to the particle 69 causing deflection thereof. Assuming a vacuum and constant velocity, the charged particle 69 will continue to orbit in a circular path 70 within the magnetic field 68. Since the charged particle 69 is continuously subjected to Lorentz forces $F_b$ as it orbits in a circular path, such forces tend to cancel one another; and, consequently, no net resultant force is exerted on the forces $F_b'$ applied to the magnetic field also cancel one another out since the charged particle 69 is orbiting in a circular path 70.

Figure 5:
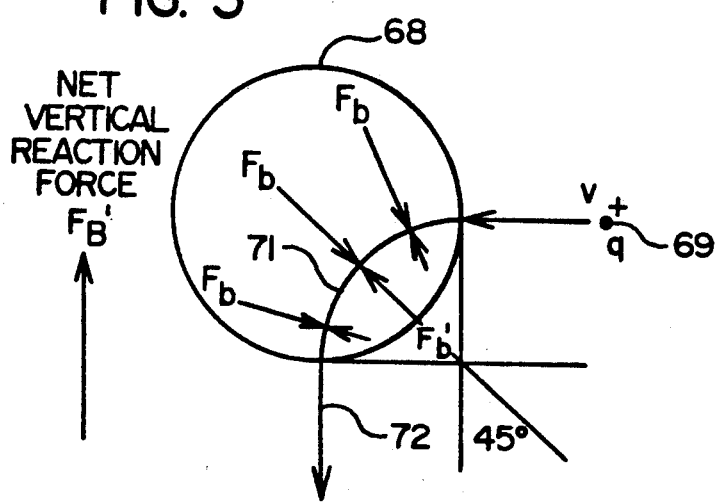
FIG. 5 is a force/velocity vector diagram somewhat similar to FIG. 4, but here theoretically illustrating the Lorentz forces applied to a charged particle as it moves into and through a magnetic field, and depicting the particle as it exits from the magnetic field after one-quarter (¼) of an orbit.

If, on the other hand, the charged particle 69 is shifted relative to the magnetic field 68 such that it enters the field radially as viewed in FIG. 5, then the Lorentz forces $F_b$ applied to the charged particle 69 will deflect the particle downwardly along the path 71, causing the particle 69 to exit the magnetic field 68 in a vertical direction as indicated at 72. And, as a consequence of Newton's Law, the sum of the Lorentz forces $F_b$ applied to the charged particle 69 as it transits path 71 will produce a resultant reaction force $F_b'$ at an angle of forty-five degrees (45°). In short, the sum of the vertical components of the Lorentz forces $F_b$ applied to the charged particle 69 will produce an equal and opposite vertical resultant reaction force $F_B'$ as here shown.

Considering next FIG. 6, there has been illustrated a typical force vector diagram for a plurality of charged particles introduced into a toroidal or ring-shaped magnetic field, here shown at 74, it being understood that while only two (2) charged particles 75, 76 are depicted as entering the magnetic field 74 radially from opposite directions, other charged particles would be introduced radially into the magnetic field 74 uniformly about its periphery. Thus, as here shown, particle 75 is introduced radially into the magnetic field 74 traveling from right-to-left as viewed in the drawing; and, upon entry into the field 74, is deflected along path 78 by Lorentz forces $F_b$ applied to the particle 75, causing the particle to exit the field vertically as indicated at 79 and producing equal and opposite reaction forces $F_b'$ acting upon the field 74. At the same time, charged particle 76, moving from left-to-right as viewed in FIG. 6, enters the opposite side of the magnetic field 74 and is deflected by Lorentz forces $F_b$ along path 80, exiting from the field 74 vertically as indicated at 81 and producing equal and opposite reaction forces $F_b'$ acting on the field. As a result, the vertical components of all resultant reaction forces $F_b'$ attributable to all charged particles introduced into the toroidal magnetic field 74 about its periphery are additive, as indicated at $F_B'$, while the horizontal components of such reaction forces, being equal and opposite, serve to cancel one another out.

Thus, it will be understood from the foregoing theoretical discussion that where a Primary Force Ring 55 (FIGS. 1 and 2) is employed in association with a aerospace vehicle, and where such Primary Force Ring 55 includes means defining a toroidal magnetic field, as charged particles are introduced into the field about the periphery of the Primary Force Ring, such particles are acted upon by Lorentz forces and deflected downwardly, exiting from the Primary Force Ring beneath the vehicle. Since Newton's Law mandates that such forces will be opposed by equal and opposite reaction forces, and since the closed loop construction insures that all horizontal components of such forces are canceled out, the net effect is to produce an upwardly directed vertical reaction force $F_B'$ which is applied to the magnetic field directly and, therefore, indirectly to the Primary Force Ring 55 and the aerospace vehicle 50 (FIGS. 1 and 2), serving to propel the vehicle in an upward vertical direction along an axis coincident with the vertical center-line of the vehicle.

C. Primary Force Ring (FIGS. 7 through 13)

Turning now to FIG. 7, it will be noted that, as previously indicated, the exemplary saucer-shaped aerospace vehicle 50 depicted in FIGS. 1 and 2 includes an annular or ring-shaped Primary Force Ring, generally indicated at 55, including an outer peripheral wall 56 and a radially inwardly spaced inner peripheral wall 58 which, in the exemplary system, is subdivided into twenty-four (24) segments, generally indicated at 82 in FIG. 7, by twenty-four (24) radial bulkheads or spars 59 spaced equidistantly apart by 15°. Each of the twenty-four (24) segments 82 is further radially subdivided into five (5) adjacent segment openings 84; and, consequently, the illustrative Primary Force Ring 55 includes a total of one hundred twenty (120) adjacent segment openings 84 in an annular ring-shaped array. The foregoing structural components defining the Primary Force Ring 55—e.g., the outer and inner peripheral walls 56, 58 and bulkheads 59—are, as previously indicated, formed of any suitable non-magnetic structural material such, merely by way of example, as aluminum or any suitable composite material characterized by its strength, lightness in weight and inability to affect or alter the magnetic and/or electric fields that are generated.

Figure 13:
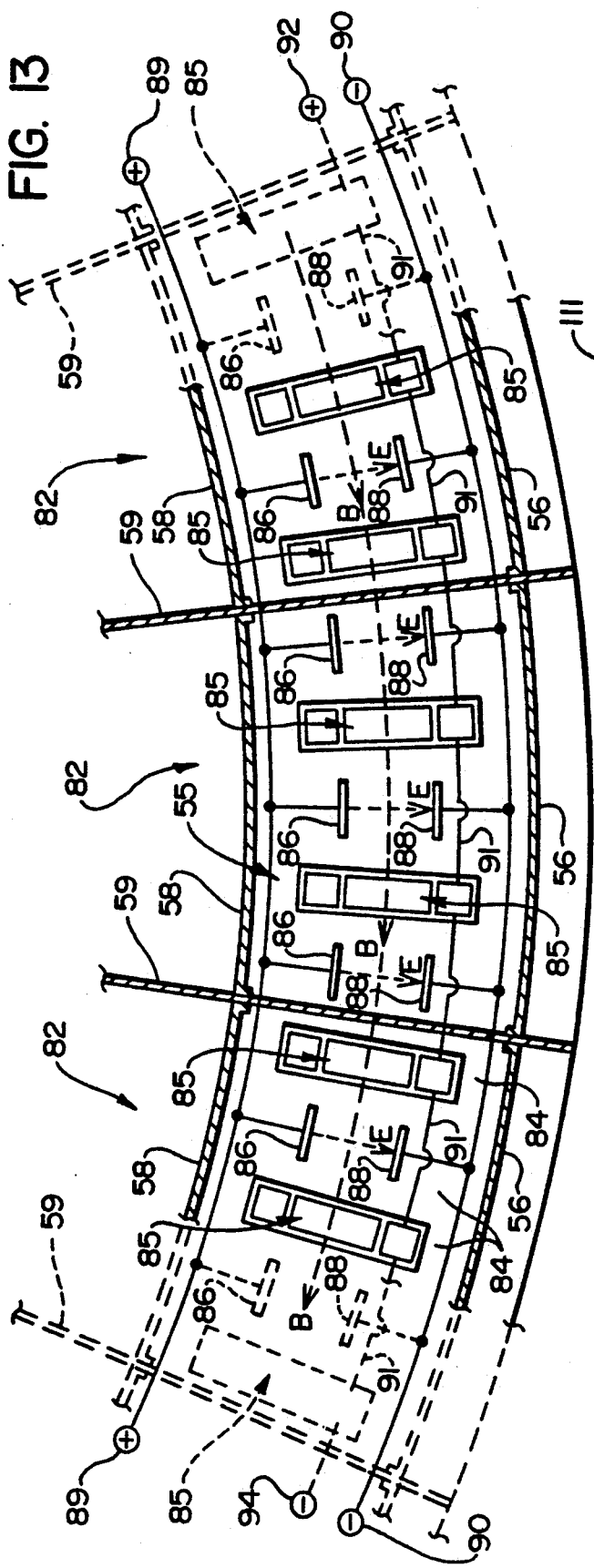
FIG. 13 is a fragmentary plan view, partially in section and partially in highly diagrammatic block and line form, here illustrating a portion of the exemplary Primary Force Ring shown in FIGS. 7 and 10 in considerably greater detail and depicting an alternating array of electric field and magnetic field generating components disposed within a closed loop, segmented, toroidal Primary Force Ring capable of generating a segmented, toroidal magnetic field, and wherein such Primary Force Ring is mounted slightly inboard of the outer peripheral ends of a plurality of radial spars or bulkheads within the exemplary saucer-shaped vehicle depicted in FIGS. 1 and 2.

In carrying out the present invention, and in order to create the desired toroidal magnetic field, a plurality of electromagnetic field coils, generally indicated at 85 in FIGS. 8 and 10 through 13—e.g., in the exemplary case, sixty (60) electromagnetic field coils 85—are positioned in the Primary Force Ring 55 with one (1) electromagnetic field coil 85 located within every other segment opening 84. Similarly, sixty (60) sets of radially spaced positive and negative electric field plates 86, 88 are positioned within respective different ones of the alternate or remaining segment openings 84 so as to define a toroidal or ring-shaped Primary Force Ring 55 having a series of sixty (60) electromagnetic field coils 85 alternating with a series of sixty (60) sets of positive and negative electric field plates 86, 88. As best shown in FIGS. 12 and 13, it will be observed that the sixty (60) positive electric field plates 86 are all connected to the positive terminal 89 of a suitable high voltage power supply (not shown in FIGS. 7 through 13); the sixty (60) negative electric field plates 88 are all connected to the negative terminal 90 of the high voltage power supply—i.e., the sets of positive and negative electric field plates 86, 88 are connected in parallel to a common high voltage power supply—while the sixty (60) electromagnetic field coils 85 are all connected to one another in series, as best indicated at 91 in FIGS. 12 and 13, and to the positive and negative terminals 92, 94 of a suitable current power supply (not shown in FIGS. 7 through 13). Of course, those skilled in the art will appreciate that it is not necessary that the sets of positive and negative electric field plates 86, 88 be connected in parallel to a common high voltage power supply, but, rather, it is within the scope of the invention to individually and independently power each of the sets of electric field plates, thereby permitting greater flexibility in guidance control as hereinafter described in Section F, infra.

Directing attention to FIGS. 11 through 13, and as best shown by reference to FIGS. 12 and 13 conjointly, it will be observed that the alternating electromagnetic field coils 85 and interposed sets of positive and negative electric field plates 86, 88 are so arranged as to establish: i) a segmented, closed loop, toroidal magnetic field B extending centrally through, and confined essentially within, the annular ring-shaped Primary Force Ring 55; and ii), a series of circumferentially spaced radial electric fields E which intersect the magnetic field B at right angles thereto. As a consequence of this arrangement, except for minor and negligible fringe effects, the magnetic field B and electric fields E are all essentially contained internally of the Primary Force Ring 55 and, therefore, do not adversely affect the environment through which the aerospace vehicle 50 (FIGS. 1 and 2) passes, nor do they tend to attract undesirable environmental metallic particles to the vehicle, thereby eliminating pitting and scoring of the vehicle hull.

As previously indicated, and as will be readily understood by those skilled in the art as the ensuing description proceeds, there is nothing critical or limiting to the invention with respect to the disclosure of a saucer-shaped vehicle 50 (FIGS. 1 and 2) or a ring-shaped Primary Force Ring 55 (FIGS. 7, 10 and 13) since the exemplary vehicle and Primary Force Ring can readily take a wide variety of other shapes or forms providing only that the Primary Force Ring 55 comprises an endless hollow structure capable of housing a plurality of spaced electromagnetic field coils 85 alternating with a corresponding plurality of sets of spaced positive and negative electric field plates 86, 88 in such a manner as to establish an endless segmented magnetic field B essentially confined within an endless Primary Force Ring and a series of spaced electric fields E in the segment openings 84 which intersect the endless magnetic field B at right angles. Similarly, there is nothing critical or limiting about the fact that the exemplary apparatus includes sixty (60) electromagnetic field coils 85 alternating with sixty (60) sets of electric field plates 86, 88; and, there can be more or fewer than one hundred twenty (120) segment openings 84. The exemplary apparatus has been illustrated merely as what might be employed in connection with a theoretical prototype vehicle of the type depicted at 50 in FIGS. 1 and 2— viz., a vehicle which is here only about twenty-six feet (26') in diameter and designed to accommodate only a one or two person crew.

D. Prior Art Conventional Plasma Generator (FIG. 14)

In carrying out the present invention, provision is made for generating a plasma of: i) positively charged molecules used to provide thrust in the exemplary Magnetohydrodynamic Propulsion System; and ii), a plurality of free electrons. To accomplish this, a plurality of plasma generators, generally indicated at 100 in FIG. 14, are provided with each such plasma generator 100 comprising a generally conventional microscopic rocket motor. It will be understood as the ensuing description proceeds that there is one such plasma generator 100 associated with each segment opening 84 in the Primary Force Ring 55 housing a pair of radially spaced positive and negative electric field plates 86, 88; and, consequently, the exemplary form of the invention herein described employs sixty (60) identical plasma generators 100.

Figure 14:
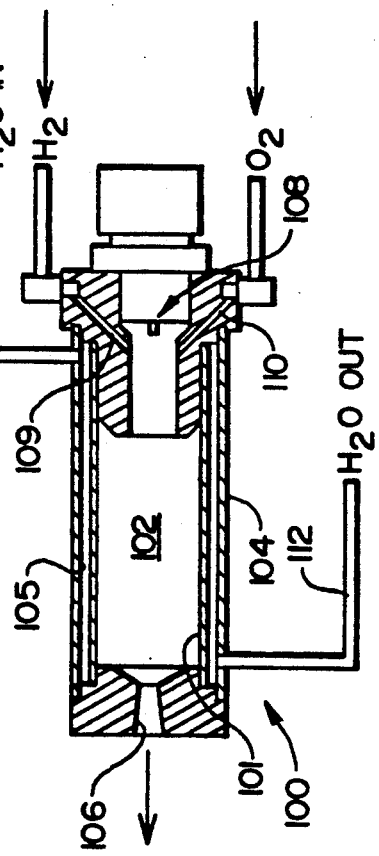
FIG. 14 is a diagrammatic elevational view, partly in section, of a conventional prior art plasma generator which here takes the form of a small microscopic hydrogen/oxygen rocket motor.

Referring to FIG. 14, it will be observed that the exemplary plasma generator 100 comprises a microscopic hydrogen/oxygen rocket motor having an inner housing 101 defining a combustion chamber 102, an outer housing 104 spaced from the inner housing 101 and defining therewith a cooling chamber 105 which here takes the form of a cylindrical water jacket surrounding the combustion chamber 102, a nozzle 106, and a jet igniter, generally indicated at 108. In the exemplary plasma generator 100, hydrogen ($H_2$) and oxygen ($O_2$) are introduced from any suitable source (not shown in FIG. 14; but, from hydrogen and oxygen collector tanks such as shown at 61, 62 in FIGS. 1 and 2) into the combustion chamber 102 via inlet lines 109, 110, respectively, where the hydrogen/oxygen fuels are combusted to form a high temperature plasma—e.g., a plasma of approximately 4800° F.—of positively charged water molecules ($H_2O^+$) and free electrons ($e^-$) which are ejected from the plasma generator 100 via nozzle 106. In the illustrative device, a cooling fluid—here, water—is introduced into the coolant jacket 105 through inlet 111, continuously circulated through the coolant jacket 105, and removed therefrom via outlet 112.

Again, it will be understood as the ensuing description proceeds that the exemplary Magnetohydrodynamic Propulsion System of the present invention is not limited to use of hydrogen/oxygen fuels as hereinabove described; but, rather, can be used with a wide variety of hydrocarbon based fuels such as propane, methane, butane and the like, or exotic fuels, whether used by themselves or as seed fuels, or in combination with more conventional fuels. However, hydrogen and oxygen fuels are desirable principally because they: i) are in ample supply at economic cost levels; ii) are generally innocuous; iii) can also be used in outer-space life support systems; iv) are less volatile and dangerous than other types of commercially available fuels; and v), the positively charged water molecule ($H_2O^+$) is a mono-molecular ion. In the case of hydrocarbon fuels on the other hand, both positively charged water molecules ($H_2O^+$) and positively charged carbon dioxide molecules ($CO_2^+$) are produced; and, since such molecules have different masses, it will be understood that they will follow different orbital paths as they pass through a magnetic field, thus introducing unnecessary, but solvable, complexities in system design. Use of hydrogen/oxygen fuels, however, results in production of a mono-molecular positively charged ion, which greatly simplifies system design.

E. Magnetohydrodynamic Aerospace Propulsion System—Operational Theory (FIGS. 15 through 21)

Figure 15:
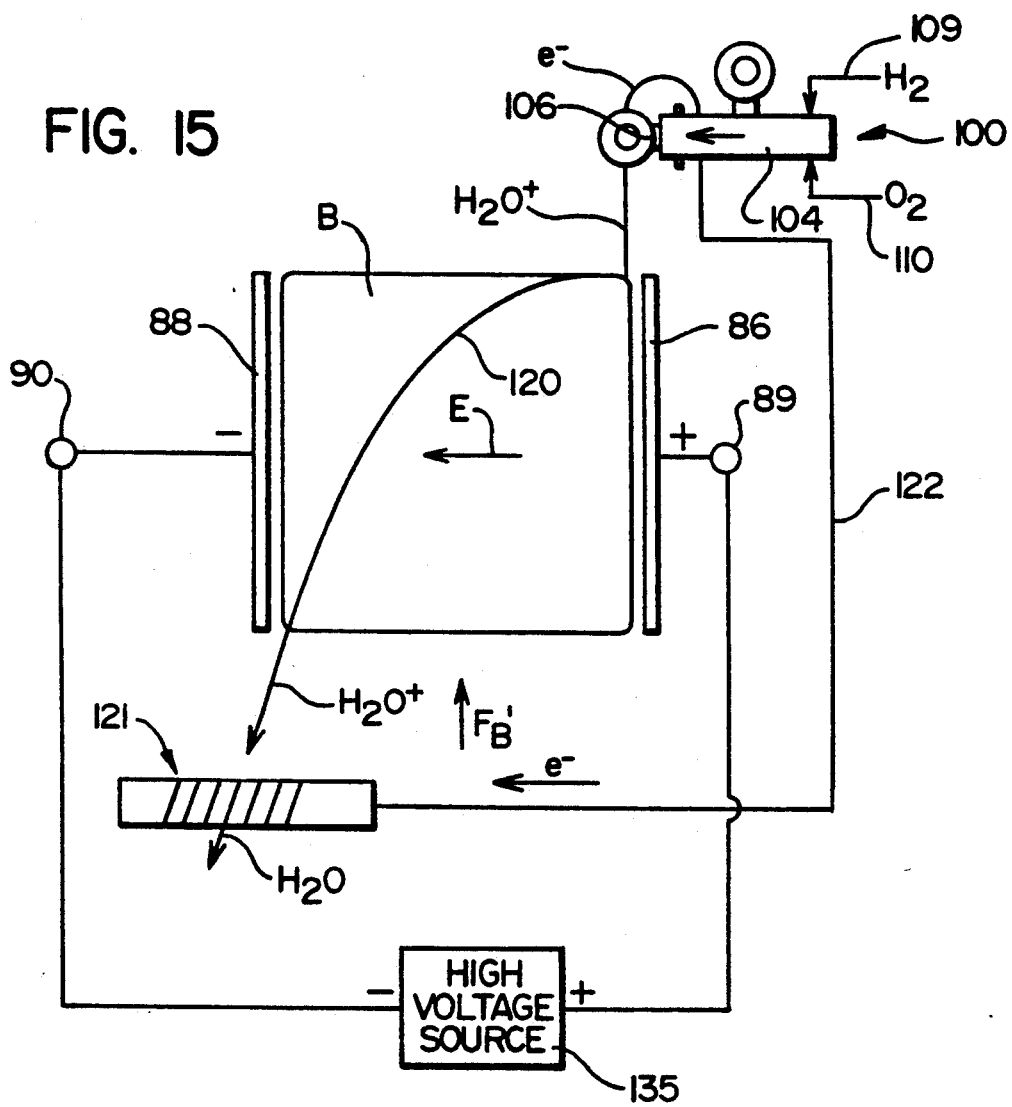
FIG. 15 is a diagrammatic view here depicting a cross section through the magnetic field of the Primary Force Ring of FIGS. 7, 10 and 13 and specifically depicting exemplary paths through which the positively charged water molecules ($H_2O^+$) and electrons ($e^-$) move during operation of the magnetohydrodynamic propulsion system of the present invention.

Turning now to FIGS. 15 through 21, and directing attention first specifically to FIG. 15, there has been illustrated, in highly diagrammatic block and line form, a vertical sectional view through one of the segment openings 84 (FIGS. 7 and 13) in the Primary Force Ring 55 through which the segmented toroidal magnetic field B passes and which houses a set of positive and negative electric field plates 86, 88 establishing an electric field E intersecting the magnetic field B at right angles thereto. In the diagrammatic view of FIG. 15, it will be appreciated that the structural components of the Primary Force Ring have been deleted for purposes of clarity, and the magnetic field B is normal to the page as FIG. 15 is viewed.

Moreover, as here shown, an exemplary plasma generator 100 of the type described in conjunction with FIG. 14 is positioned immediately above and adjacent to the upper inboard edge of the positive electric field plate 86 in such a manner that positively charged water molecules ($H_2O^+$) and free electrons ($e^-$) comprising the high temperature plasma exiting from the hydrogen/oxygen rocket motor nozzle 106 can be deflected, with the positively charged water molecules ($H_2O^+$) being deflected downwardly towards, into, and passing through, the magnetic field B under the influence of Lorentz forces as previously described in connection with FIG. 6, and with deflected in the opposite direction—i.e., away from the magnetic field B—and conveyed to a point where they can be recombined with the positively charged water molecules ($H_2O^+$) after the latter exit from the magnetic field B. Because the positively charged water molecules ($H_2O^+$) are also passed through the electric field E within the particular segment opening 84 (FIGS. 7 and 13), it will be understood by those skilled in the art that the accelerated.

Thus, as here shown, positively charged water molecules ($H_2O^+$) exiting the hydrogen/oxygen rocket motor nozzle 106 will be deflected downwardly, in a manner herein described below, towards and into the magnetic field B, transiting that field along the arcuate path indicated at 120 under the influence of Lorentz forces and exiting such field beneath the Primary Force Ring 55 (FIGS. 2 and 19) where they are passed through an electron transfer grid assembly, generally indicated at 121, where such positively charged water molecules ($H_2O^+$) are recombined with free electrons ($e^-$) conveyed from the rocket motor housing 104 to the electron transfer grid assembly 121 via a conductive path indicated at 122, which path may simply comprise the conductive portions of the exemplary aerospace vehicle's airframe and/or hull. As a consequence, the positively charged water molecules ($H_2O^+$) are reconverted into water droplets which are discharged from the electron transfer grid assembly 121 at a point beneath the aerospace vehicle 50 (FIGS. 2 and 19) and introduced into the environment external to the vehicle as innocuous water droplets as indicated at 124 in FIG. 15.

Figure 16:
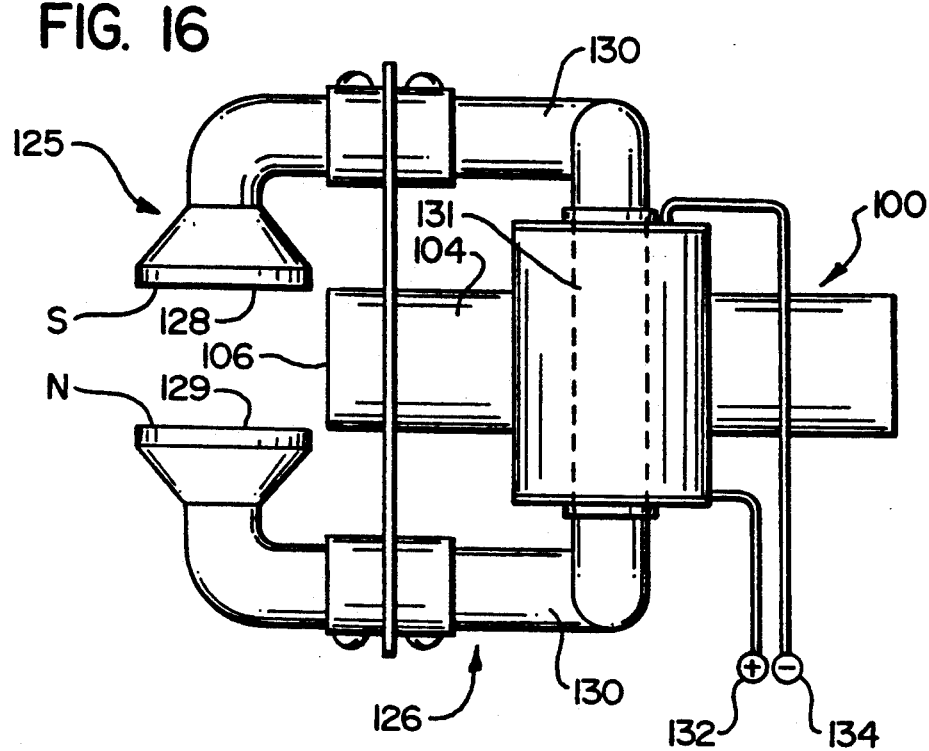
FIG. 16 is a top plan view of an exemplary ion deflector assembly mounted at the discharge nozzle of the plasma generator of FIG. 14 and used to deflect the positively charged water molecules ($H_2O^+$) towards and into the magnetic field as shown in FIG. 15.
Figure 17:
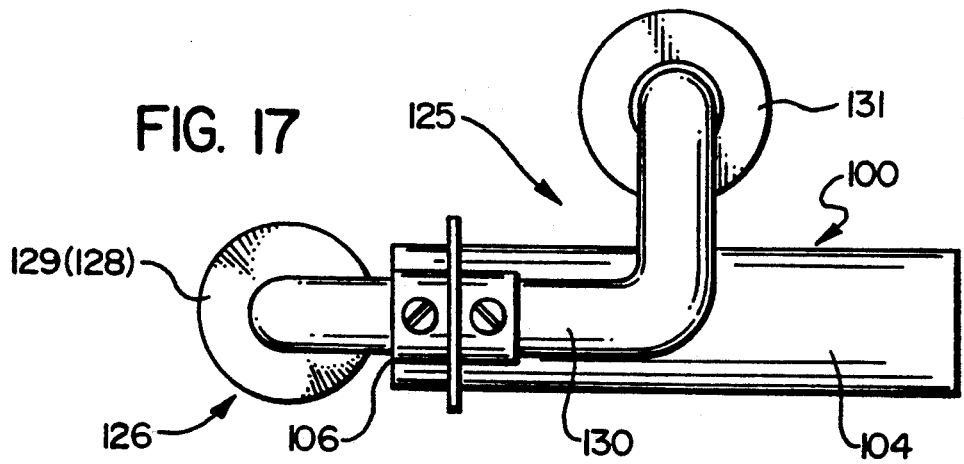
FIG. 17 is a side elevation of the ion deflection assembly shown in FIG. 16.

In carrying out this aspect of the present invention, an ion deflection assembly, best shown in FIGS. 16 and 17 and generally indicated at 125, is employed to separate the high temperature plasma exiting the hydrogen/oxygen rocket motor nozzle 106 into its constitute components—viz., positively charged water molecules ($H_2O^+$) and free electrons ($e^-$)—and to deflect the former in one direction downwardly into the segmented toroidal magnetic field B and the intersecting electric field E, while deflecting the free electrons ($e^-$) in the opposite direction—i.e., away from the magnetic field B—and causing them to be attached to the nozzle or housing 104 of the plasma generator 100, thereby enabling conveyance of the free electrons ($e^-$) via the transmission path 122 comprising the conductive portions of the vehicle airframe and/or hull to the electron transfer grid assembly 121. To this end, the exemplary ion deflector assembly 125 depicted in more detail in FIGS. 16 and 17 includes an electromagnet, generally indicated at 126, having: i) a south pole face 128 and a facing spaced north pole face 129 disposed on opposite sides of the plasma stream exiting the rocket motor nozzle 106 and establishing a magnetic field intersecting the plasma stream at 90°; ii) a core 130; and iii), a coil 131 surrounding the core 130 and coupled to the positive and negative terminals 132, 134 of a suitable power source (not shown).

Thus, the arrangement is such that as the plasma stream exits the rocket motor nozzle 106, it passes through the magnetic field normal thereto and extending between the pole faces 128, 129 of the electromagnet 126, causing the positively charged water molecules ($H_2O^+$) within the plasma stream to be deflected downwardly into the segmented toroidal magnetic field B and the intersecting electric field E adjacent the upper edge of the positive electric field plate 86 as shown in FIG. 15. Moreover, it will be understood that the deflected positively charged water molecules ($H_2O^+$) are then attracted towards the negative electric field plate 88 as they move downwardly and through the magnetic field B along path 120 under the influence of Lorentz forces. However, by properly designing the system in terms of: i) the spacing between the electric field plates 86, 88; ii) the strength of the magnetic field; iii) the magnitude of the electric field; and iv), the mass of the positively charged particle or fuel molecule being used, it can be assured that the positively charged molecule never reaches and impacts the negative plate 88 but, rather, is always discharged from the magnetic field B into the region beneath the Primary Force Ring 55.

In the exemplary theoretical prototype apparatus herein depicted and described, the positive and negative electric field plates 86, 88 are spaced apart by approximately one-quarter ($\frac{1}{4}$) meter or roughly ten inches (10"); and, consequently, application of five hundred thousand volts (500,000 v.) to the plates 86, 88 results in a charge of approximately two million (2,000,000) volts/meter. Since the mass of a positively charged water molecule ($H_2O^+$) is a known factor, the charge level on the molecules and their consequent velocity can be readily determined. Indeed, assuming a charge of two million (2,000,000) volts per meter, and assuming that a positively charged water molecule ($H_2O^+$) is introduced into the intersecting magnetic and electric fields B, E where it is acted upon by Lorentz forces and deflected along a path 120 as shown in FIG. 15, it can be readily determined mathematically that particle acceleration will be such that the theoretical particle velocity achievable would be on the order of ONE PERCENT (1%) of the speed of light.

While it is believed that the mathematical calculations necessary to determine such factors as: i) the value of the Lorentz force $F_B$ applied to a positively charged particle moving in a magnetic field; ii) particle velocity; iii) particle acceleration; iv) the time required for the particle to pass through the magnetic field; and v), force per unit of time, are well within the knowledge of persons skilled in the art, nevertheless a brief description of the mathematics involved may be of assistance in understanding the theoretical operation of the present invention. Thus, it will be understood that the force applied to a charged particle in an electric field is represented by the following Equation [2]:

$$F_E = q\vec{E}; \quad [2]$$

where $F_E$ is the force on a charged particle in the electric field, q is the charge on the particle, and $\vec{E}$ is the strength of the electric field in volts/meter. Moreover, since it is known that the strength $\vec{E}$ of an electric field is simply the voltage V applied to the positively and negatively charged electric field plates 86, 88 (FIG. 15) divided by the interplate spacing or distance d—i.e.:

$$\vec{E} = V/d; \quad [3]$$

it will be appreciated from substitution of Equation [3] into Equation [2] that the force $F_E$ is:

$$F_E = qV/d. \quad [4]$$

Those skilled in the art will further appreciate that the Lorentz force $F_B$ applied to a charged particle moving through a magnetic field is represented by the following Equation [5]:

$$F_B = qv\vec{B} \sin \theta; \quad [5]$$

where q is the value of the charge on the particle, v is particle velocity, $\vec{B}$ is the strength of the magnetic field in teslas, and $\theta$ is the angle between the magnetic field B and the velocity vector of the particle. Since sine $\theta$ is equal to one ("1") at an angle of ninety degrees (90°), it will be apparent that the maximum Lorentz force $F_B$ will occur at an angle $\theta$ of ninety degrees (90°), whereas any other angle $\theta$ will result in a reduction of the Lorentz force applied to the charged particle.

It will further be understood that force F is equal to mass m times acceleration a—i.e.:

$$F = ma; \quad [6]$$

and, therefore, acceleration of the charged particle is:

$$a = F/m. \quad [7]$$

Acceleration of the charged particle in the x direction—i.e., acceleration of the particle from the positively charged electric field plate 86 (FIG. 15) towards the negatively charged electric field plate 88—may be simply expressed as:

$$a_x = qV/md; \quad [8]$$

where q is the charge on the particle, V is the voltage applied to the electric field plates 86, 88 (FIG. 15), m is the mass of the particle, and d is the interplate distance or spacing.

Similarly, the distance d that the particle travels in the x direction—i.e., between the electric field plates 86, 88 (FIG. 15)—as it transits path 120 extending through the magnetic field B may be expressed as:

$$d = \tfrac{1}{2}a_x t^2; \quad [9]$$

where $a_x$ is particle acceleration in the x direction between the positive and negative electric field plates 86, 88 (FIG. 15) and t is total time. Therefore, the total transit time t required for the particle to pass through the magnetic field B is:

$$t = \sqrt{2d/a_x} \; ; \quad [10]$$

and, substituting Equation [8] into Equation [10]:

$$t = \sqrt{2d^2 \, m/qv} \; . \quad [11]$$

Finally, force per unit time $F_t$ may be expressed as:

$$F_t = q(E + vB). \quad [10]$$

Given the fact that in any specific system design certain of the foregoing variables are known predetermined values—for example, having selected a given fuel such as hydrogen/oxygen, the charge q on the positively charged water molecule ($H_2O^+$), as well as its mass m, are known values, as are the voltage V applied to the electric field plates 86, 88, the magnetic field strength $\vec{B}$, the electric field strength $\vec{E}$, and the interplate spacing d—one can readily solve the foregoing equations to determine particle velocity v, particle acceleration $a_x$, total transit time t, Lorentz force $F_B$, and force per unit time $F_t$. Consequently, one can readily design the system's variable parameters to produce a total Lorentz force $F_B$ sufficient to create an equal and opposite reaction force $F_B'$ (See, Equation [1], supra) more than adequate to propel a vehicle 50 (FIGS. 1 and 2) of given size and weight through a desired flight profile such as shown in FIG. 24.

Figure 19:
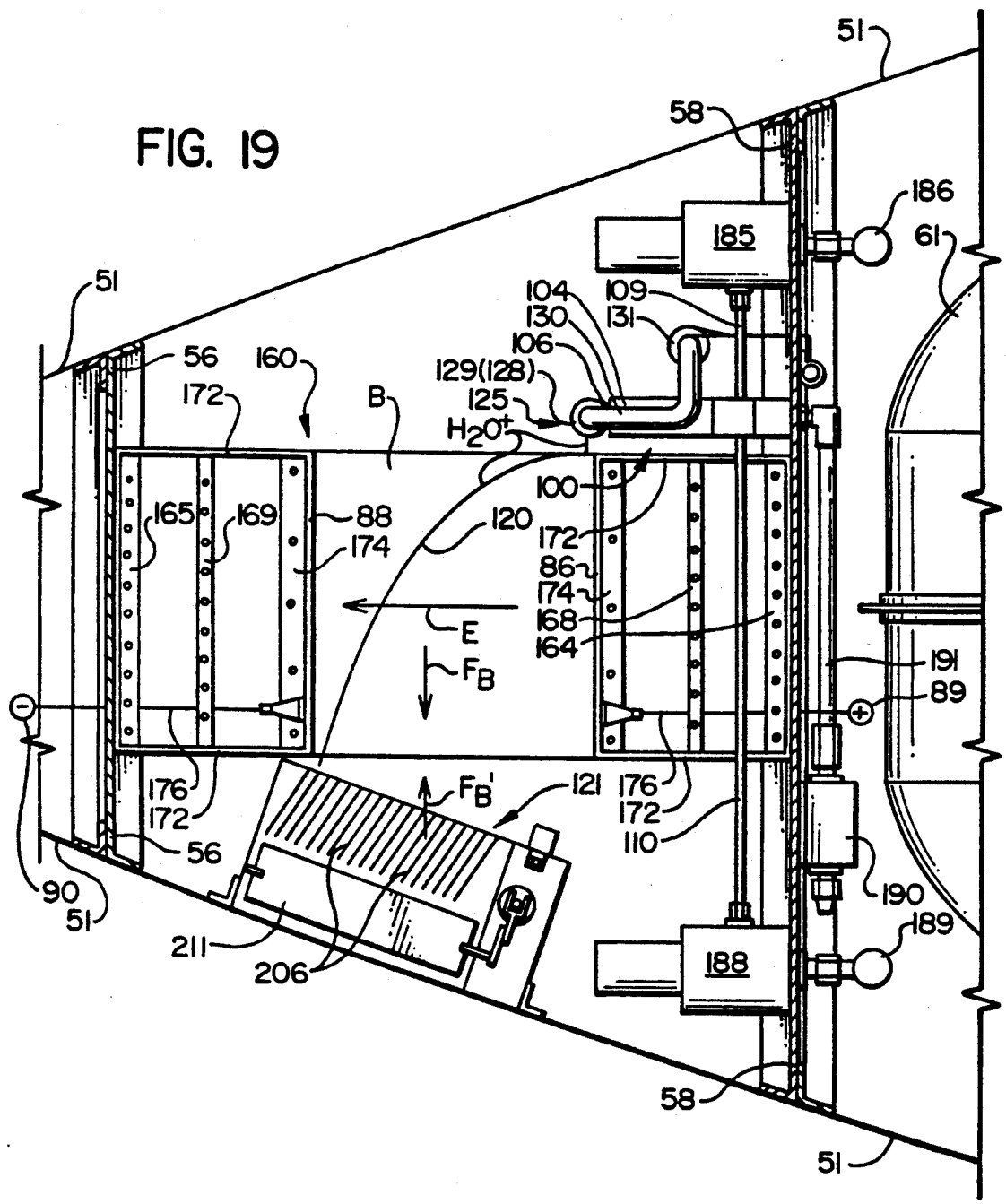
FIG. 19 is a fragmentary elevational view similar to FIG. 18, again partially in section and partially in diagrammatic block and line form, but here taken substantially along the line 19—19 in FIG. 1, and depicting details of one of the exemplary electric field plate assemblies employed with the present invention.

Thus, by controlling the voltage applied to the spaced field plates 86, 88 from the high voltage source 35 shown in FIG. 15, one can control the particle velocity achieved, while increasing and decreasing the strength of the magnetic field B serves to control the path 120 that the positively charged water molecule ($H_2O^+$) follows as the molecule passes through the segmented toroidal magnetic field B. And, since it is possible to control particle velocity by varying the voltage applied to the field plates 86, 88, it will be understood that the greater the velocity achieved, the greater the resultant reaction force $F_B'$ that is achieved and applied directly to the electromagnetic field B and, therefore, indirectly to the Primary Force Ring 55 (FIGS. 7, 10, 13 and 19) and the vehicle 50 (FIGS. 1, 2 and 19).

Moreover, those skilled in the art will appreciate that the system design is such that the efficiencies achievable will increase with the size of the vehicle and the Primary Force Ring, since the greater the distance of the path 120 through which the particle is accelerated, the greater will be the velocity that is actually achieved and, therefore, the greater will be the forces applied to the particles and the consequent reaction force $F_B'$ applied directly to the magnetic field B and indirectly to the vehicle 50 and Primary Force Ring 55.

Figure 18:
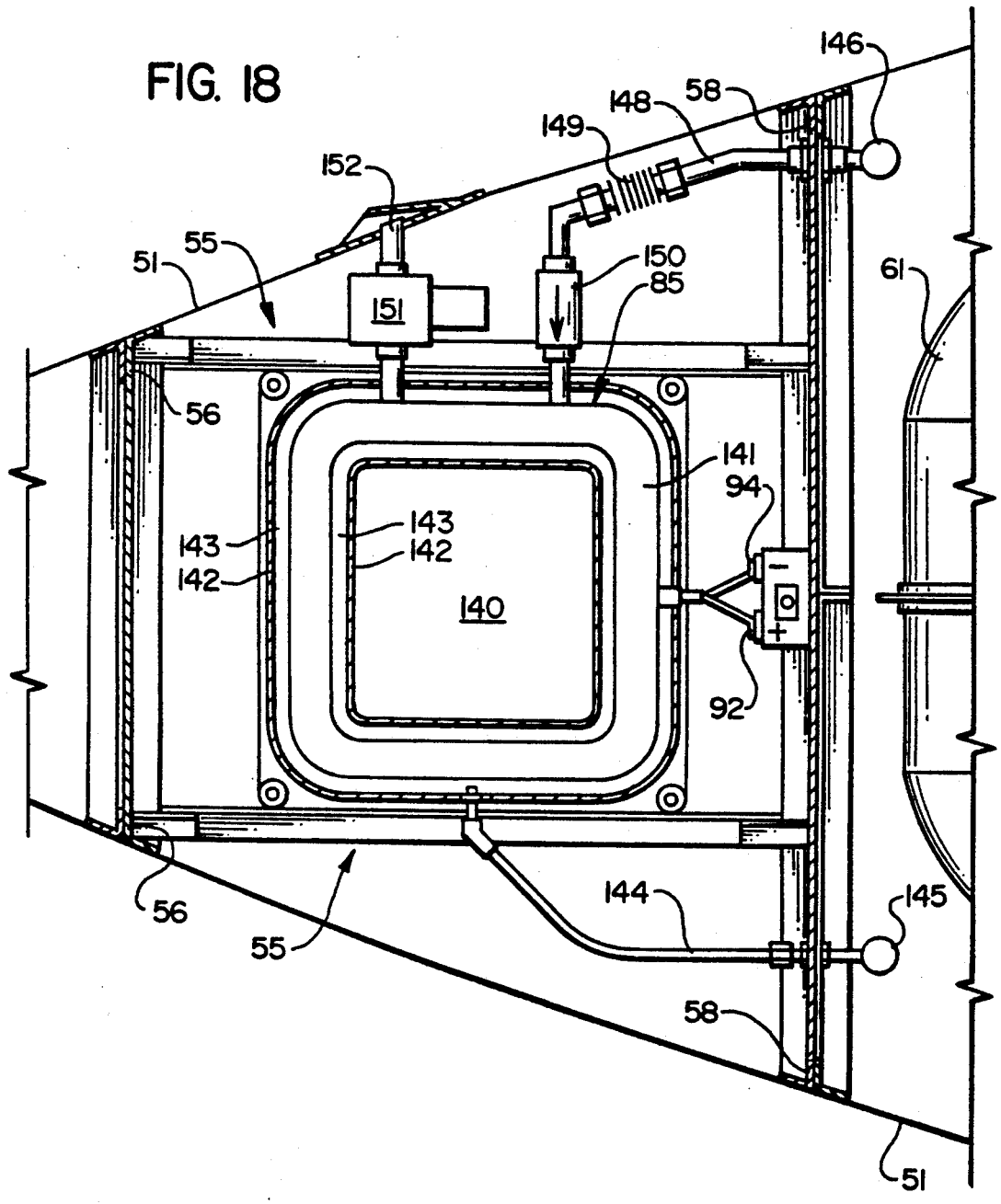
FIG. 18 is a fragmentary elevational view partially in section and partially in diagrammatic block and line form, taken substantially along the line 18—18 in FIG. 1, and here depicting details of one of the exemplary superconducting electromagnetic field coil assemblies employed with the present invention.

Turning now to FIG. 18, the structural relationship between the exemplary vehicle hull 51, the outer and inner peripheral walls 56, 58 defining the Primary Force Ring 55, and an exemplary superconducting electromagnetic field coil, generally indicated at 85, have been illustrated in somewhat greater detail. Thus, as here shown, each exemplary superconducting electromagnetic field coil 85 includes an air core 140 and an enclosed endless housing 141, preferably made of aluminum, containing a coil (not shown) comprising, for example, one thousand (1000) turns or windings of any suitable metal conductor having superconductivity characteristics when subjected to a temperature on the order of three degrees Kelvin (3° K.), a temperature typically found in the presence of a liquid helium coolant. In the illustrative superconducting electromagnetic field coil 85, the windings (not shown) disposed within endless housing 141 are coupled to the positive and negative terminals 92, 94 of a suitable current power supply or generator (not shown) capable of delivering, for example, seven hundred twenty-four (724) amperes to the exemplary closed loop system which, as previously described, includes sixty (60) identical superconducting electromagnetic field coils 8 coupled together in series as shown in FIGS. 12 and 13.

In carrying out this aspect of the present invention, the endless housing 141 for the coil windings is disposed centrally within a second endless housing 142 surrounding housing 141 and defining therewith an enclosed chamber 143 adapted to be coupled to a vacuum line 144 and vacuum manifold 145 for a evacuating the chamber 143. Thus, the arrangement is such that the surrounding vacuum chamber 143 functions in a manner similar to a conventional vacuum bottle for minimizing "boil-off" of the liquid coolant such, for example, as liquid helium supplied from any suitable source (not shown) to the interior of coil housing 141 via manifold 146, inlet line 148 including an expansion joint 149, and a unidirectional fill check valve 150, with the liquid helium coolant serving to cool the superconducting electromagnetic field coil 85. A suitable pressure regulator 151 is coupled to coil housing 141 and a vent port 152 on the vehicle hull 51 for allowing "boil-off" of the liquid helium or other liquid coolant.

Figure 20:
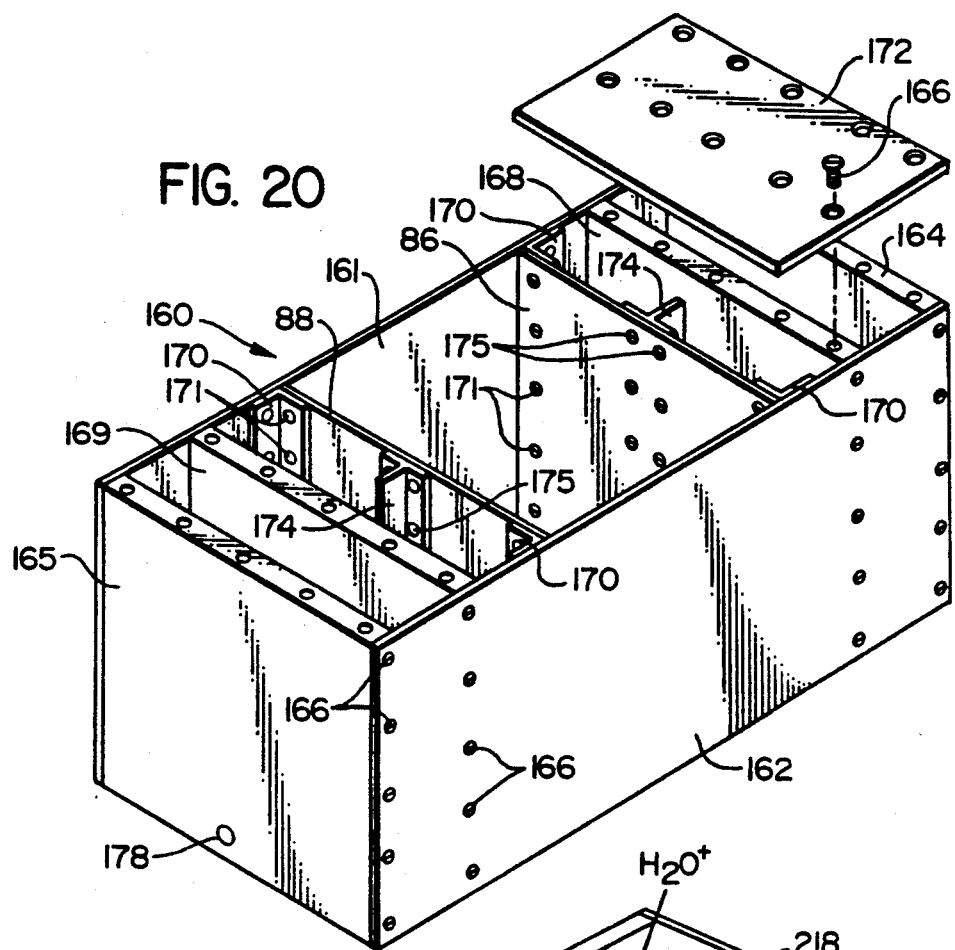
FIG. 20 is a partially exploded isometric view of one of the exemplary electric field plate assemblies employed with the present invention, here depicting the assembly with only one (1) of the four (4) cover plates employed.
Figure 21:
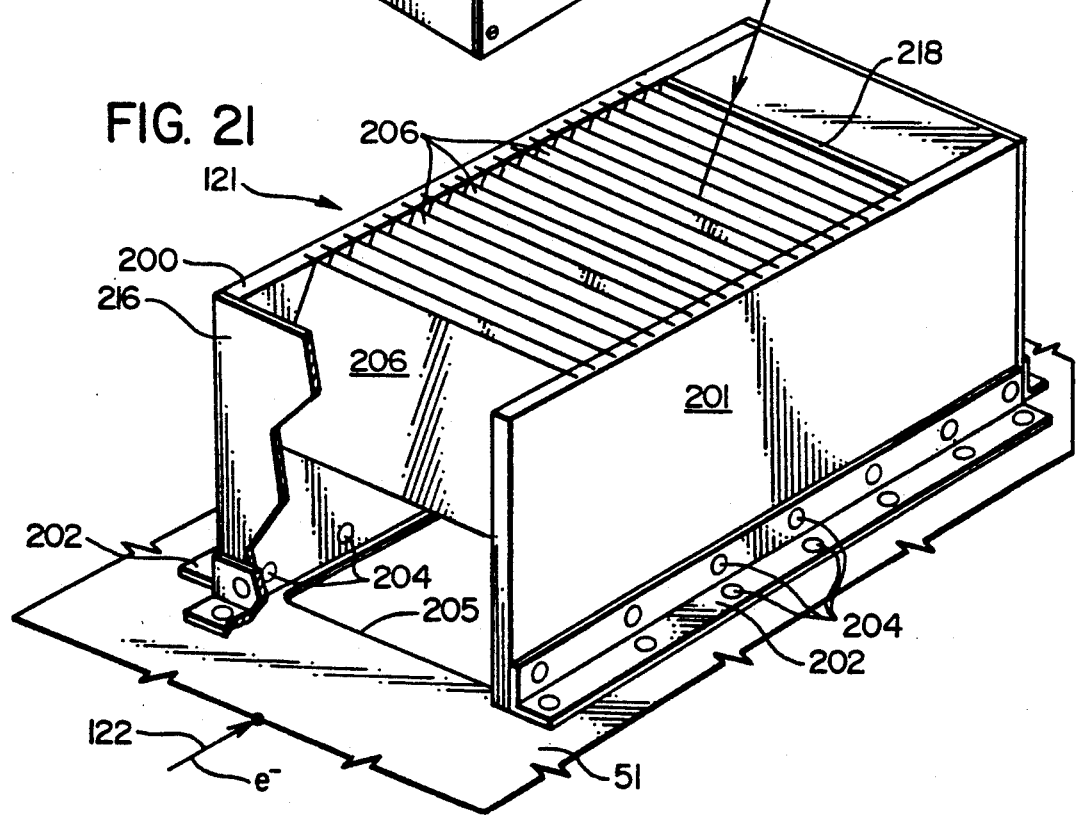
FIG. 21 is an isometric view, partially broken away and with parts removed for purposes of clarity, of an exemplary electron transfer grid assembly used with the present invention to combine the positively charged water molecules ($H_2O^+$) exiting from the Primary Force Ring with electrons so as to recombine the same and produce innocuous water droplets exiting from the vehicle.

Referring next to FIGS. 19 and 20, an exemplary one of the sixty (60) electric field plate assemblies, generally indicated at 160, has been illustrated in structural detail in FIG. 20 and has been shown in FIG. 19 mounted within the Primary Force Ring 5 in juxtaposition to the plasma generator 100, the ion deflector assembly 125, and the electron transfer grid assembly 121. Thus, referring first to FIG. 20, it will be observed that each electric field plate assembly 160 comprises a rigid box-like structure defined by: i) a pair of spaced parallel sidewalls 161, 162; ii) a first pair of rigid outer end support plates 164, 165 secured to the sidewalls 161, 162 by nylon screws 166 or similar non-conductive fasteners; iii) a second pair of rigid inner support plates 168, 169 secured to the sidewalls 61, 162 by nylon screws 166; iv) the spaced positive and negative electric field plates 86, 88 which are parallel to the support plates 168, 169 and spaced inwardly therefrom, such electric field plates 86, 88 being secured to the sidewalls 161, 162 by L-shaped brackets 170 which are flush riveted to the sidewalls 161, 162 and the electric field plates 86, 88 as indicated at 171; and v), four (4) cover elements, only one of which is shown at 172 in FIG. 15, such cover element spanning the area between the sidewalls 161, 162, the positive electric field plate 86, and outer support plate 164.

It will be appreciated by those skilled in the art that while only one such cover element 172 has been depicted in FIG. 20 for purposes of clarity, identical cover elements would be provided spanning the region beneath the electric field plate assembly 160 extending between the sidewalls 161, 162, the positive electric field plate 86, and outer support plate 164, as well as the corresponding regions between the sidewalls 161, 162, the negative electric field plate 88, and the outer support element 165 both above and below the electric field plate assembly 160, all as indicated diagrammatically in FIG. 19. All such cover elements 172 are preferably secured to the two (2) support plates which they overlie or underlie by means of nylon screws 166 or similar non-conductive threaded fasteners.

In keeping with this aspect of the invention, rigid T-shaped support elements 174 are secured to the back sides of the positive and negative electric field plates 86, 88 by flush rivets 175, thereby minimizing, and preferably precluding, deflection of the electric field plates 86, 88 under the influence of the electric field extending therebetween which tends to attract the plates 86, 88 towards one another.

Those skilled in the art will readily appreciate that the only structural components of the electric field plate assembly 160 which need be formed of conductive material are the positive and negative electric field plates 86, 88. All other components, including the sidewalls 161, 162, support plates 164, 165, 168, 169, L-shaped brackets 170, cover elements 172, T-shaped support elements 174, and all fasteners 166, 171, are preferably formed of non-conductive, non-magnetic materials characterized by their strength, lightness in weight, and inability to disrupt the segmented toroidal magnetic field. For example, such components can be formed of fiberglass, carbon-carbon or other composite materials, or the like. As best shown by reference to FIGS. 19 and 20, conjointly, it will be noted that the positive and negative electric field plates 86, 88 are coupled to respective ones of the positive and negative terminals 89, 90 of a suitable high voltage power supply (not shown in FIGS. 19 and 20, but indicated diagrammatically at 135 in FIG. 15) by means of high voltage conductors 176 passing through openings in the support plates 164, 165, 168, 169, one of such openings being depicted at 178 in support plate 165 as shown in FIG. 20.

Having in mind the structural organization of the electric field plate assembly 160, reference is now made to FIG. 19 where one of the sixty (60) exemplary electric field plate assemblies 160 has been shown mounted in a segment opening 84 (FIGS. 7 and 13) in the Primary Force Ring 55 between the outer and inner peripheral walls 56, 58 thereof. In carrying out the present invention, each electric field plate assembly 160 has associated therewith a plasma generator 100 mounted on the inner peripheral wall 58 of the Primary Force Ring 55 immediately above the upper cover element 172 spanning the region between the positive electric field plate 86, outer end support element 164, and the sidewalls 161, 162. The plasma generator 100 is so positioned relative to the electric field plate assembly 160 that the microscopic rocket motor nozzle 106 and ion deflector assembly 125 are located immediately above the upper edge of the positive electric field plate 86 so as to insure that positively charged water molecules ($H_2O^+$) or other positively charged fuel molecules are deflected downwardly into the Primary Force Ring 55 between the spaced positive and negative electric field plates 86, 88 at a point immediately adjacent the upper edge of the positive electric field plate 86.

Consequently, as those skilled in the art will appreciate from the foregoing description, the positively charged water molecules ($H_2O^+$) entering the Primary Force Ring 55 will pass through the segmented toroidal magnetic field B (which, in FIGS. 15 and 19 is normal to the page) and the intersecting electric field E extending between the plates 86, 88. As the positively charged water molecules ($H_2O^+$) pass downwardly through the segmented toroidal magnetic field B along path 120, they are acted upon by Lorentz forces $F_B$ in the manner previously described, thereby producing an equal and opposite reaction force $F_B'$ in accordance with Newton's Law which is exerted directly against the magnetic field B and, therefore, indirectly against the Primary Force Ring 55 and vehicle hull 51, serving to exert a propulsive force on the vehicle 50 (FIGS. 1 and 2) for propelling the vehicle along a desired flight profile through the atmosphere and/or outer space.

In keeping with this aspect of the invention, a pilot and/or computer controlled variable flow hydrogen inlet valve 185 mounted on the Primary Force Ring's inner peripheral wall 58 serves to provide a controllable supply of hydrogen fuel to the microscopic rocket motor or plasma generator 100 via hydrogen inlet line 109. To this end, the hydrogen inlet control valve 185 is coupled via hydrogen manifold 186—which is also coupled to the remaining fifty-nine (59) hydrogen inlet control valves 185 (not shown) associated with each of the remaining electric field plate assemblies 160—to the hydrogen collector tanks 61 (FIGS. 1, 2 and 19) in any suitable manner (not shown). In like manner, a second pilot and/or computer controlled variable flow oxygen inlet valve 188 is mounted on the inner peripheral wall 58 of the Primary Force Ring 55 and serves to controllably supply oxygen fuel to the microscopic rocket motor or plasma generator 100 via oxygen inlet line 110. Again, all sixty (60) oxygen fuel control valves 188 are coupled via oxygen manifold 189 to the oxygen collector tanks 62 (FIGS. 1 and 2) in any suitable manner (not shown).

Those skilled in the art will appreciate that the particular electronic and/or computer controls selected to adjust, vary and control fuel supplied to the plasma generators, as well as all other electronic and/or computer control systems that might be employed in conjunction with the present invention, are completely conventional and well within the skill and knowledge of experienced system designers in the aerospace field. Since such control systems form no part of the present invention and are completely conventional, they are not described herein. Moreover, those skilled in the art will appreciate that all of the variable flow hydrogen and oxygen inlet valves 185, 188—in the exemplary prototype system there are sixty (60) of each—will be independently controllable so as to enable production of controlled uniform or non-uniform propulsive thrust about the periphery of the vehicle 50 for enabling pitch and/or attitude control.

In order to initiate ignition and combustion of the hydrogen/oxygen fuels within the plasma generator 100, the exemplary propulsion system includes a high voltage ignition box 190 of completely conventional construction, such ignition box being mounted on the inner peripheral wall 58 of the Primary Force Ring 5 and being supplied with high voltage from any suitable and conventional high voltage power supply (not shown). As here shown, the high voltage ignition box 190 is coupled to the jet igniter 108 (FIG. 14) via a suitable high voltage transmission line 191.

As previously noted in connection with the description of FIGS. 15 and 19, the positively charged water molecules ($H_2O^+$) or other positively charged fuel molecules, after passing through the segmented toroidal electromagnetic field B and intersecting electric field E along path 120, are discharged from the intersecting fields beneath the Primary Force Ring 55 and are directed into and through an electron transfer grid assembly 121 where they are recombined with free electrons ($e^-$) previously separated from the plasma stream exiting the nozzle 106 of the plasma generator 100 so as to form innocuous water droplets ($H_2O$) which can be safely discharged into the surrounding atmosphere or space environment external to the vehicle 50. To this end, and as best understood by reference to FIGS. 19 and 21 conjointly, it will be noted that the exemplary electron transfer grid assembly 121 includes a pair of spaced electrically conductive support plates 200, 201 which are fixedly secured to the vehicle hull 51 by means of conductive L-shaped support brackets 202 and suitable fasteners such as rivets 204. The spaced conductive support plates 200, 201 are, in the exemplary apparatus, secured to the vehicle hull 51 on opposite sides of a discharge opening 205 formed therein, with the upper portions of the conductive support plates 200, 201 serving to support a plurality of closely spaced, parallel, stationary conductive grid plates 206 which are preferably angled in such a manner that the grid plates 106 are approximately, but not precisely, parallel to the paths along which the positively charged water molecules ($H_2O^+$) discharged from the Primary Force Ring 55 pass.

As a consequence of the foregoing construction, the positively charged water molecules ($H_2O^+$) tend to glancingly contact the conductive grid plates 206 as they pass downwardly therebetween—i.e., the positively charged water molecules ($H_2O^+$) tend to contact and glance off the grid plates 206 at a small included oblique angle of only a few degrees or less so as to minimize creation of any significant force vectors. At the same time, the free electrons ($e^-$) separated from the plasma stream exiting the microscopic rocket motor nozzle 106 by the ion deflector assembly 125 are, as previously described in connection with FIG. 15, conveyed from the rocket motor housing 104 to the electron transfer grid assembly 121 via any suitable conductive path 122 which may, for example, simply comprise the conductive portions of the vehicle airframe and/or hull 51; and, since the support plates 200, 201, L-shaped brackets 202, and grid plates 206 are all formed of conductive materials, the grid plates 206 will be negatively charged. Therefore, as the positively charged water molecules ($H_2O^+$) discharged from the Primary Force Ring 55 pass between the negatively charged grid plates 206 and glancingly contact the latter, the free electrons ($e^-$) and positively charged water molecules ($H_2O^+$) are recombined, forming innocuous water droplets ($H_2O$) which are discharged from the vehicle 50 (FIGS. 1 and 2) through the discharge opening 205 (FIG. 21) formed in the vehicle hull 51 immediately beneath the electron transfer grid assembly 121.

F. Attitude/Guidance Control (FIGS. 22 through 24)

As thus far described, it will be evident to those skilled in the art that the prototype Magnetohydrodynamic Propulsion System hereinabove described provides for the economic generation of a large quantities of positively charged water molecules ($H_2O^+$) or other positively charged fuel molecules which are introduced into the segment openings 84 (FIGS. 7 and 13) and, therefore, into the closed-loop, segmented, toroidal magnetic field B and the intersecting radial electric fields E disposed within an endless closed-loop Primary Force Ring 5 which extends about the entire periphery of an aerospace vehicle such, for example, as the vehicle 50 depicted in FIGS. 1 and 2. Moreover, it will further be understood that the positively charged fuel molecules are acted upon by Lorentz forces $F_B$ as they pass through the magnetic field B while, at the same time, they are accelerated by the intersecting radial electric fields E.

Since the resultant Lorentz forces $F_B$ are, for all practical purposes, directed vertically downward on the downwardly moving positively charged fuel molecules, the resultant equal and opposite reaction force $F_B'$ is directed vertically upward; or, essentially parallel to the vertical axis of the vehicle—it being understood that because of the symmetry of the system, all horizontal components of both the Lorentz forces $F_B$ and the equal and opposite reaction forces $F_B'$ will cancel one another out. As a consequence, a propulsion force $F_B'$ is created which acts directly against the segmented toroidal magnetic field B and, therefore, indirectly against the Primary Force Ring 55 and the vehicle hull 51. Assuming that the exemplary vehicle 50 is oriented in a horizontal plane, such vertical resultant propulsion force $F_B'$ will move the vehicle 50 vertically upward along a flight path coincident with the vehicle's vertical centerline.

At the same time, the arrangement is such that after passing through the magnetic field B, the positively charged water molecules ($H_2O^+$) or other positively charged fuel particles are recombined with free electrons ($e^-$) and discharged at high velocity vertically downward beneath the vehicle as innocuous water droplets ($H_2O^+$) in the case of hydrogen/oxygen fuel and/or as inert or uncharged particles in the case of hydrocarbon and/or other exotic fuels.

In accordance with another of the important objectives of the present invention, advantage is taken of the fact that horizontally directed force vectors can readily be generated by the innocuous water molecules being discharged at high velocity to provide YAW control so as to enable propulsion of the vehicle 50 in any desired horizontal direction and/or in directions at acute angles to a vertical axis coincident with the vertical centerline of the vehicle. To this end, and as best illustrated by reference to FIGS. 19, 22 and 23 conjointly, a YAW control assembly, generally indicated at 210 is provided having a plurality of pivotally adjustable control flaps 211. As here illustrated, the YAW control assembly 210 is mounted between the conductive support plates 200, 201 forming part of the electron transfer grid assembly 121 shown in FIG. 21, with the adjustable control flaps 211 being positioned beneath the stationary conductive grid plates 206 and being oriented at right angles with respect thereto.

Thus, referring to FIGS. 22 and 23, it will be noted that each of the adjustable YAW control flaps 211 is mounted at its opposite ends on stub shafts 212, 214 journaled for rotation in bearing assemblies 215 fixedly mounted in a pair of end walls 216, 218 secured at or adjacent opposite ends of the conductive support plates 200, 201. The adjustable control flaps 211 are here mounted for pivotal movement about a horizontal axis (as viewed in FIGS. 22 and 23) defined by the stub shafts 212, 214, with the control flaps 211 being disposed beneath and at right angles with respect to the plane of each of the stationary conductive grid plates 206.

In order to change the position of the adjustable control flaps 211, the outboard end of each stub shaft 214 is splined or otherwise non-rotatably secured to the lower end of a control link 219 having its upper end rotatably pinned at 220 to the horizontal leg 221 of a T-shaped link actuator, generally indicated at 222. The vertical leg 224 of the T-shaped link actuator 222 is bifurcated (as best shown in FIG. 22) to form spaced vertical leg portions 224a, 224b, each of which is provided with an elongated slot 225 (FIG. 23). Finally, a pair of oppositely directed coaxial solenoids 226, 228 having a common actuating rod 229 passing between the bifurcated leg portions 224a, 224b are mounted on end wall 218 by means of brackets 230. In the illustrative apparatus, the common actuating rod 229 is provided with a diametrically extending pin 231 which is received within the slots 225 formed in the bifurcated vertical leg portions 224a, 224b. A pair of springs 232, 234, bottomed at one end on respective ones of the solenoids 226, 228 and at their opposite end on respective ones of a pair of radial flanges 235, 236 integral with the common solenoid actuating rod 229 serve to center the T-shaped link actuator 222 when the solenoids are de-energized and the YAW control system 210 is OFF.

Thus, the arrangement is such that when the solenoids 226, 228 are de-energized, the T-shaped link actuator 22 is located in the solid line position shown in FIG. 23; and, consequently the control flaps 211 are all in the vertical positions shown in broken lines. As a result, the innocuous water droplets ($H_2O$) exiting from the electron transfer grid assembly 121 (as shown in FIG. 22) which are traveling at high velocity in a vertical direction, pass between adjacent flaps 211 without significant contact therewith and are discharged into the atmosphere or space environment externally of the vehicle 50 through opening 205 (FIGS. 21 and 22) in the hull 51 without affecting the vehicle's flight path.

However, when solenoid 226 is energized to draw actuating rod 229 to the left as viewed in FIG. 23, such movement causes the T-shaped link actuator 222 to move to the left. Since the lower ends of the links 219 are coupled to the rotatable, but otherwise immovable, stub shafts 214, the T-shaped link actuator 222 not only moves to the left, but, additionally, it moves downwardly toward the dotted line position indicated at 222a in FIG. 23. As a consequence, all of the flaps 211—viz., the exemplary seven flaps shown in FIG. 23—are pivoted in a counterclockwise direction as viewed in FIG. 23 to the dotted line angular position shown at 211a for the leftmost flap where they occupy a position somewhat analogous to a partially closed venetian blind, thereby positioning the flaps 211 at a desired, and controllable, angle of inclination directly in the path of the water droplets (H$_2$O) which are being discharged at high velocity from the electron transfer grid assembly 121.

Thus, the impacts between the high velocity water droplets and the control flaps 211 cause a resultant horizontal force vector $F_X$ (FIG. 23) acting against the inclined YAW control flaps 211. And, since it will be appreciated from inspection of FIG. 19 that the YAW control flaps 211 are essentially parallel to a radial or diametric centerline passing horizontally through the vehicle's vertical axis, it will be apparent that the resultant horizontal force vector $F_X$ (which is directed to the left as viewed in FIG. 23) is actually perpendicular to the vehicle's radial or diametric horizontal centerline—i.e., it extends vertically out of the page as viewed in FIG. 19—thus tending to rotate the vehicle 50 in a counterclockwise direction about its vertical axis as viewed in FIG. 1. Of course, it will be understood that if one or more of the sixty (60) sets of YAW control flaps 211 are pivoted in the same direction—i.e., one or more of the sixty (60) solenoids 226 are simultaneously energized—the composite of all resultant horizontal force vectors $F_X$ will simply cause the vehicle 50 to spin counterclockwise as viewed from above in a horizontal plane about its vertical axis.

If, on the other hand, solenoid 228 is energized, the actuating rod 229 will be shifted to the right as viewed in FIG. 23, thus shifting the T-shaped actuator 222 to the right and downwardly towards the position indicated in phantom at 222b. This, in turn, pivots all of the control flaps 211 in the particular YAW control assembly 210 in the opposite or clockwise direction as viewed in FIG. 23 towards the phantom line position indicated at 211b for the rightmost flap 211 so that when such flaps are impacted by high velocity water molecules (H$_2$O) discharged from the electron transfer grid assembly 121, a resultant horizontal force vector $F_Y$ is created which, in this instance, is directed to the right as viewed in FIG. 23—i.e., the resultant horizontal force vector F is again perpendicular to the vehicle's radial or diametric centerline but it now extends vertically into the page as viewed in FIG. 19, causing the vehicle to rotate in a clockwise direction about its vertical axis as viewed from above. Again, it will be understood that if one or more of the sixty (60) YAW controller solenoids 228 are energized simultaneously, the net result will be to cause the vehicle 50 to spin clockwise about its vertical axis—i.e., in a direction opposite to the counterclockwise direction of spin when one or more of the solenoids 226 are energized.

Having in mind the foregoing operation of the exemplary YAW control assembly 210, it will be appreciated that if it is desired to make the vehicle move in a forward direction, the solenoids 228 associated with selected ones of the port side YAW control assemblies 210 will be energized, shifting the YAW control flaps 211 for those particular selected YAW control assemblies 210 into the dotted line position shown at 211b in FIG. 23; while, at the same time, the solenoids 226 associated with corresponding selected YAW control assemblies 210 on the opposite or starboard side of the vehicle will be energized, shifting those selected starboard control flaps 211 into the phantom line position shown at 211a in FIG. 23. As a consequence, the horizontal force vector $F_Y$ which is directed perpendicular to the vehicle's horizontal diametric centerline on the port side of the vehicle is assisted by the horizontal force vector $F_X$ which is directed perpendicular to the vehicle's horizontal diametric centerline on the starboard side of the vehicle, with the two force vectors $F_X$, $F_Y$ being additive and causing the vehicle to move in a forward direction.

Similarly, if it is desired to move the vehicle horizontally to the left, the solenoids 226 associated with selected YAW control assemblies 210 along the leading edge of the vehicle will be energized to shift the selected leading edge control flaps 211 to the position shown at 211a in FIG. 23, while simultaneously the solenoids 228 associated with corresponding selected sets of YAW control assemblies 210 along the trailing edge of the vehicle will be energized to shift the selected trailing edge YAW control flaps 211 to the position shown at 211b in FIG. 23, producing additive force vectors $F_X$ and $F_Y$ causing the vehicle to move horizontally to the left. Thus, it will be seen that by selective energization of the solenoids 226, 228, the vehicle can be made to spin in either direction about its vertical axis without lateral movement or, alternatively, it can be caused to move laterally in any desired direction.

Those skilled in the art will appreciate that operation of the YAW control solenoids 226, 228 can be achieved by computer program or manually by the pilot with or without computer assistance. The speed of movement in any lateral direction will be a function of: i) the angle of inclination of the flaps 211; ii) the number and positions of the sets of YAW control flaps 211 that are actuated; iii) the volume, and therefore the mass, of water droplets (H$_2$O) being discharged; and iv), the velocity of the water droplets (H$_2$O) being discharged, which velocity is a function of the strength of the electric field E applied between the positively and negatively charged electric field plates 86, 88 (FIGS. 15 and 19).

In accordance with yet another of the important aspects of the present invention, the propulsion system herein described readily permits of control of pitch and/or roll of the vehicle 50 (FIGS. 1 and 2)—it being understood that pitch and roll of a saucer-shaped vehicle are essentially identical—as well as YAW control as described hereinabove. Thus, as will be understood from the foregoing description, assuming that all YAW control flaps 211 are in the inactive vertical position, and assuming further that the equal and opposite reaction force $F_B'$ described above in conjunction with FIGS. 15 and 19 is uniformly applied about the periphery of the vehicle 50, those skilled in the art will appreciate that the vehicle will be propelled vertically upward along a path coincident with the vehicle's vertical axis or centerline.

If, on the other hand, the resultant reaction forces $F_B'$ are applied differentially about the vehicle periphery, then the vehicle's pitch and/or roll will be affected. For example, assuming that fuel is supplied to only selected ones of the vehicle's port side plasma generators 100 (FIGS. 15 and 19) while no fuel is supplied to the corresponding starboard side plasma generators 100, then a resultant propulsion force $F_B'$ will be directed vertically upward on the port side of the toroidal magnetic field B, causing the port side of the vehicle 50 to move upwardly about a fore/aft centerline passing horizontally through the vehicle; and, as long as that differential force setting prevails, the vehicle 50 will simply roll about that horizontal centerline. Conversely, if no fuel is supplied to the port side plasma generators 100 while fuel is supplied to the starboard side plasma generators 100, the vehicle will then pitch or roll in the opposite direction. Those skilled in the art will, of course, understand that in most practical in-flight operational situations, fuel will be supplied to all plasma generators on a continual basis even when it is desired to alter the pitch-/roll characteristics of the vehicle; and, the desired degree of control will be achieved by simply relatively increasing fuel supplied to the plasma generators 100 on one side of the vehicle 50 with respect to the fuel supplied to the plasma generators 100 on the opposite side of the vehicle.

Thus, it will be appreciated that differentially supplying fuel to the port and starboard plasma generators 100 will serve to control the speed and degree of pitch/roll guidance control achieved. Moreover, pitch and/or roll control is not limited to port and starboard control but, rather, controlling the quantities of fuel supplied to the plasma generators associated with the leading and trailing edges of the vehicle 50 will serve to control forward and/or rear pitch. Indeed, pitch and/or roll can be controlled in any radial direction with respect to the vehicle's vertical centerline by selectively and differentially controlling the quantity of fuel supplied to the plasma generators 100 on any diametrically opposite sides of the vehicle 50.

Moreover, those skilled in the art will appreciate that while the present system has been described in conjunction with electric field assemblies which are connected in parallel as shown in FIG. 13, it is within the scope of the invention to design the system in such a way that each of the electric field assemblies is totally independent and each is provided with an independent high voltage power supply. In such an instance, pitch/roll control can also be achieved by differentially controlling the velocity of the positively charged fuel particles on opposite sides of the vehicle. Thus, by increasing the electric field E on, for example, the port side of the vehicle relative to the electric field E on the starboard side of the vehicle, the velocity of the positively charged port side fuel particles will be increased and, consequently, the propulsive reactive force $F_B'$ on the port side of the vehicle will be greater than that on the starboard side, again resulting in pitch/roll control.

All of the foregoing guidance control features may, of course, be used separately or in any desired combination in order to control the vehicle's flight path. For example, where the vehicle 50 is to move from point A to point B on an atmospheric or even stratospheric flight where weightlessness is not a factor, particularly in the case of relatively short flights, it may be desirable to operate the vehicle 50 vertically during take-off and-/or landing, while operating the vehicle horizontally between points A and B using the YAW control system to effect forward movement while the vehicle resides in a horizontal plane. On the other hand, in deep space and/or interplanetary travel where weightlessness is a factor, it may be preferable to simply propel the vehicle at all times at constant acceleration and/or deceleration in either a forward or rearward direction coincident with the vehicle's vertical axis, relying upon the pitch-/roll control system above described to turn and/or flip the vehicle so as to alter course.

Turning now to FIG. 24, there has been illustrated an exemplary, but typical, flight profile for a vehicle 50 embodying the Magnetohydrodynamic Propulsion System of the present invention traveling through space from, for example, planet A to planet B. Thus, as here shown the vehicle is initially located on planet A as indicated at $50_a$. During the initial portion of the flight, fuel will be supplied uniformly about the periphery of the vehicle with the YAW control system in its neutral, or OFF, position; and, consequently, a vertical upward propulsive thrust will be exerted on the vehicle in the manner hereinabove described, causing the vehicle to move vertically upwardly along a path coincident with the vehicle's vertical axis from position $50_a$ through position $50_b$ and towards position $50_c$. During this portion of the trip as indicated at 250, the vehicle will be subjected to constant acceleration as it moves vertically upward along such path through planet B's atmosphere towards and into the stratosphere.

As the vehicle approaches an orbital altitude where it is desirable to initiate one or more course corrections, fuel flow to the vehicle's plasma generators is controlled to cause the vehicle to roll (in a clockwise direction as viewed in FIG. 24) through an angle of 90° as indicated at 251, with the vehicle assuming the position shown at $50_d$; at which point the vehicle begins to accelerate along its new course directed towards a landing on planet B with the vehicle constantly accelerating through the region 252 during the first half D/2 of its flight path as it progressively moves from the position indicated at $50_d$ through the positions indicated at $50_e$, $50_f$ and $50_g$ towards position $50_h$ located approximately at the midpoint D/2 of its planned flight path to planet B.

Of course, it will be understood that at the instant the vehicle rolls into the position shown at $50_d$, the vehicle's vertically upward momentum will cause it to continue to climb under ballistic conditions through the region 254 at the same time that it continues to accelerate as it moves to the right through region 252. Once the vehicle's ballistic momentum is dissipated, it will be necessary to control the vehicle's pitch, as indicated at $50_f$ and $50_g$, to insure that the vehicle's orbital path and/or interplanetary trajectory remains as programmed and does not decay.

When the vehicle reaches the approximate midpoint D/2 of its interplanetary flight path, once again fuel flow to the plasma generators 100 is controlled to cause the vehicle to roll (in a counterclockwise direction as viewed in FIG. 24) through an angle of 180° as indicated at 255. Thereafter, the vehicle continues to move to the right as viewed in FIG. 24 through the region indicated at 256 and progressively through positions $50_i$, $50_j$, $50_k$, $50_l$ and towards position $50_m$, during which period of time: i) the vehicle is decelerating; ii) the vehicle's flight path is controlled and prevented from undesirable decay by making necessary pitch adjustments as indicated at $50_j$, $50_k$; and iii), as the vehicle approaches a point vertically above its planned destination on planet B, it is subjected to ballistic travel conditions in the region 258 as it begins its descent under the influence of planet B's gravity.

Once the vehicle reaches the position shown at $50_m$, fuel to the plasma generators 100 (FIGS. 15 and 19) is again adjusted to cause the vehicle to roll (in a clockwise direction as indicated at 259 in FIG. 24) through an angle of 90°. Thereafter, the vehicle continues to decelerate through the region 260 as it moves vertically downward through positions $50_n$, $50_o$ in planet B's stratosphere and atmosphere, ultimately landing on the planet B as indicated at $50_p$.

Those skilled in the art will, of course, appreciate that in those instances where the embarkation/destination points A, B are located relatively close together and where space travel is not required—for example, flights between east coast and west coast destinations in North America or even intercontinental travel—the YAW control system 210 can be employed to achieve flight in a horizontal direction between the points of embarkation and destination while the vehicle remains in a horizontal attitude with fuel supplied to the plasma generators 100 (FIGS. 15 and 19) being controlled so as to produce an equal and opposite vertical reaction force $F_B'$ sufficient to maintain the vehicle at a fixed desired altitude without decay in the vehicle's flight path.

In order to place travel in a vehicle made in accordance with the present invention in its proper perspective, it should be understood that a prototype vehicle 50 such as herein described having a diameter on the order of twenty-six feet (26'), and including twenty-four (24) hydrogen collector tanks 61 and twelve (12) oxygen collector tanks 62 each having a capacity of 2.6 cubic feet, would carry a fuel load of approximately 458.5 pounds—viz., sufficient fuel to permit travel of several thousand miles from, perhaps, Seattle to Hawaii. However, if the system is scaled up to create a vehicle roughly sixty feet (60') in diameter and eighty-four feet (84') in height capable of carrying 500,000 pounds of propellant, such a vehicle would be capable of traveling from earth to Mars in approximately sixty-five (65) hours—viz., roughly 2.7 days—and, therefore, a round trip between earth and Mars would require approximately 5.4 days or one hundred thirty (130) hours including approximately two (2) days of weightlessness in each direction, all as contrasted with present-day space craft requiring nine (9) or ten (10) months of weightlessness conditions when traveling between the same two points.

Thus, it will be apparent to those skilled in the art that there has herein been described a propulsion system suitable for use in traveling between two spaced points on a single planet or deep space travel between different planets which is characterized by the economic formation of relatively large quantities of positively charged ions. Such positively charged ions are then accelerated through intersecting magnetic and electric fields wherein the individual positively charged fuel particles are acted upon by Lorentz forces, producing an overall equal and opposite resilient force $F_B'$ acting directly upon the vehicle's magnetic field and, therefore, indirectly upon the vehicle itself to propel the vehicle through the atmosphere and/or space along a path coincident with its vertical centerline. The propulsion system readily permits of pitch, roll and YAW control so as to enable guidance of the vehicle as it moves between a point of embarkation and its destination. Because the propulsion system of the present invention readily permits of the use of hydrogen/oxygen fuels which are in plentiful supply and characterized by their economy, the overall propulsion system is characterized not only by its economy but, also, by the fact that it is relatively safe and will not result in pollution of the surrounding environment.

I claim:

1. A Primary Force Ring for use with a magnetohydrodynamic propulsion system for a vehicle, said Primary Force Ring comprising, in combination:

a) means defining an endless closed loop vehicle housing;
   b) means mounted on said vehicle housing for generating a plurality of discrete electric fields equally spaced apart about said endless closed loop vehicle housing; and,
   c) means mounted on said vehicle housing intermediate said discrete spaced apart electric field generating means for generating an endless closed loop segmented magnetic field essentially contained within said housing and intersecting said discrete spaced electric fields substantially at right angles with respect thereto.

2. A Primary Force Ring as set forth in claim 1 wherein said housing comprises an annular toroid defined by spaced inner and outer peripheral walls.

3. A Primary Force Ring as set forth in claim 2 wherein said means for generating an endless closed loop magnetic field comprises a plurality of spaced electromagnetic field coils mounted on said inner and outer peripheral walls.

4. A Primary Force Ring as set forth in claim 3 wherein said means for generating a plurality of discrete electric fields comprises means defining at least one voltage source and a plurality of pairs of spaced apart positive and negative electric field plates coupled to said voltage source defining means with said positive and negative electric field plates being substantially parallel to, and disposed intermediate of, said inner and outer peripheral walls; and, wherein one pair of said spaced positive and negative electric field plates are interposed between each adjacent pair of said spaced electromagnetic field coils so that the electric field extending between said positive and negative electric field plates of each pair intersects the endless closed loop segmented magnetic field generated by said electromagnetic field coils substantially at right angles with respect thereto.

5. A Primary Force Ring for use with a magnetohydrodynamic propulsion system, said Primary Force Ring comprising, in combination:

a) means defining an endless closed loop housing having spaced apart inner and outer walls;
   b) a plurality of spaced apart electromagnetic field coils mounted within said housing for establishing an endless closed loop segmented magnetic field essentially contained within said housing; and,
   c) a plurality of pairs of parallel spaced apart positive and negative electric field plates mounted within said housing with said plates being generally parallel to said spaced apart inner and outer walls with one pair of positive and negative electric field plates being interposed between each adjacent pair of spaced apart electromagnetic field coils for establishing a plurality of spaced apart electric fields intersecting said endless closed loop segmented magnetic field substantially at right angles with respect thereto.

6. A Primary Force Ring as set forth in claim 5 wherein said housing comprises an inner toroid defined by spaced inner and outer peripheral walls.

* * * * *